US012294135B2

(12) United States Patent
Kim et al.

(10) Patent No.: US 12,294,135 B2
(45) Date of Patent: May 6, 2025

(54) ANTENNA DEVICE

(71) Applicant: KMW INC., Hwaseong-si (KR)

(72) Inventors: Duk Yong Kim, Yongin-si (KR); Kyo Sung Ji, Hwaseong-si (KR); Chi Back Ryu, Hwaseong-si (KR); Seong Man Kang, Hwaseong-si (KR); Oh Seog Choi, Hwaseong-si (KR); Yong Won Seo, Daejeon (KR); Hyoung Seok Yang, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 147 days.

(21) Appl. No.: 18/108,031

(22) Filed: Feb. 10, 2023

(65) Prior Publication Data

US 2023/0187807 A1 Jun. 15, 2023

Related U.S. Application Data

(63) Continuation of application No. PCT/KR2021/010106, filed on Aug. 3, 2021.

(30) Foreign Application Priority Data

Aug. 14, 2020 (KR) ........................ 10-2020-0102772
Aug. 2, 2021 (KR) ........................ 10-2021-0101104

(51) Int. Cl.
*H01Q 1/02* (2006.01)
*H01Q 1/24* (2006.01)
(Continued)

(52) U.S. Cl.
CPC ............... *H01Q 1/02* (2013.01); *H01Q 1/246* (2013.01); *H01Q 21/08* (2013.01); *H01Q 9/0414* (2013.01); *H01Q 9/0435* (2013.01)

(58) Field of Classification Search
CPC .......... H01Q 1/02; H01Q 1/246; H01Q 21/08; H01Q 9/0414; H01Q 9/0435; H01Q 9/045;
(Continued)

(56) References Cited

U.S. PATENT DOCUMENTS

2015/0048978 A1* 2/2015 Derovanessian ........ H05K 7/20 343/702
2018/0019769 A1 1/2018 Hu et al.
(Continued)

FOREIGN PATENT DOCUMENTS

JP 2019-519156 A 7/2019
KR 10-2015-0095673 A 8/2015
(Continued)

OTHER PUBLICATIONS

Non-final Office Action mailed on Apr. 9, 2024 from the Japanese Patent Office for Japanese Application No. 2023-508539.
(Continued)

*Primary Examiner* — Daniel D Chang
(74) *Attorney, Agent, or Firm* — Insight Law Group, PLLC; Seung Lee

(57) ABSTRACT

The present invention relates to an antenna device, comprising: a front housing including antenna arrangement units in which at least one radiation element is disposed on the front sides thereof, and heat dissipation units formed between adjacent antenna arrangement units and being exposed to outside air to transfer heat generated from the rear side to the front; and a rear housing coupled to the front housing and provided with a filter for filtering RF signals and a main board on which an RF element is mounted, wherein the heat generated from the filter is transferred to
(Continued)

the front of the front housing through the contact with the back surface of the front housing by using the filter as a heat transfer medium.

21 Claims, 23 Drawing Sheets

(51) Int. Cl.
*H01Q 9/04* (2006.01)
*H01Q 21/08* (2006.01)

(58) Field of Classification Search
CPC .. H01Q 21/0025; H01Q 21/065; H01Q 21/24; H01Q 1/38; H01Q 9/0407
See application file for complete search history.

(56) References Cited

U.S. PATENT DOCUMENTS

| | | | | |
|---|---|---|---|---|
| 2018/0219277 | A1 | 8/2018 | Hirata et al. | |
| 2018/0316086 | A1* | 11/2018 | Lehman | H04W 76/40 |
| 2020/0021005 | A1* | 1/2020 | Kosaka | H01Q 1/42 |
| 2020/0120836 | A1 | 4/2020 | Choi et al. | |

FOREIGN PATENT DOCUMENTS

| | | |
|---|---|---|
| KR | 10-2017-0050437 A | 5/2017 |
| KR | 10-2019-0033699 A | 4/2019 |
| KR | 10-2020-0038836 A | 4/2020 |
| KR | 10-2020-0051617 A | 5/2020 |

OTHER PUBLICATIONS

International Search Report mailed Nov. 19, 2021 for International Application No. PCT/KR2021/010106 and its English translation.
Non-final Office Action mailed Aug. 9, 2022 from the Korean Intellectual Property Office for Korean Application No. 10-2021-0101104.
Extended European Search Report mailed Oct. 11, 2024 from the European Patent Office for European Application No. 21856115.7.

* cited by examiner (a)

(b)

ANTENNA DEVICE

CROSS-REFERENCE TO RELATED APPLICATIONS

This application is a continuation application of International Application No. PCT/KR2021/010106, filed Aug. 3, 2021, which claims the benefit of Korean Patent Application Nos. 10-2020-0102772, filed Aug. 14, 2020; and 10-2021-0101104, filed Aug. 2, 2021, in the Korean Intellectual Property Office, the disclosures of which are incorporated herein in their entirety by reference.

TECHNICAL FIELD

The present disclosure relates to an antenna apparatus, and more particularly, to an antenna apparatus which can improve heat dissipation performance, can be manufactured to be slimmed, and can reduce a manufacturing cost of a product by removing the radome of a conventional antenna apparatus and disposing a radiation element in the front housing of the antenna apparatus.

BACKGROUND ART

A base station antenna including a relay, which is used in a mobile communication system, has various forms and structures. In general, the base station antenna has a structure in which multiple radiation elements are properly disposed on at least one reflection plate that stands upright in a length direction thereof.

Recently, research for satisfying high performance needs for a multi-input multi-output (MIMO)-based antenna and also achieving a small-sized, light-weight, and low-cost structure is actively carried out. In particular, in the case of an antenna apparatus to which a patch type radiation element for implementing a linear polarized wave or circular polarized wave has been applied, in general, a method of plating a radiation element formed of a dielectric board made of a plastic or ceramic material and combining the radiation element with a printed circuit board (PCB), etc. through soldering is widely used.

FIG. 1 is an exploded perspective view illustrating an example of an antenna apparatus according to a conventional technology.

In an antenna apparatus 1 according to a conventional technology, as illustrated in FIG. 1, multiple radiation elements 35 are arranged to be exposed to the front surface of an antenna housing body 10, that is, a beam output direction, so that a beam is output in a desired direction and beamforming is facilitated. For protection against an external environment, a radome 50 is mounted on the front end part of the antenna housing body 10 with the multiple radiation elements 35 interposed therebetween.

More specifically, the antenna apparatus 1 includes the antenna housing body 10 provided in a thin rectangular parallelepiped inclusion body shape having a front surface opened and having multiple heat dissipation pins 11 integrally formed on a back surface thereof, a main board 20 stacked and disposed on the back surface within the antenna housing body 10, and an antenna board 30 stacked and disposed on a front surface of the antenna housing body 10 within the antenna housing body 10.

Multiple power feed-related part elements for control of calibration power feed are mounted on the main board 20. Heat of elements that is generated in a power feed process is discharged backward through the multiple heat dissipation pins 11 behind the antenna housing body 10.

Furthermore, a power supply unit (PSU) board 40 on which PSU elements are mounted is stacked on the lower side of the main board 20 or the lower side of the antenna housing body 10 or is disposed at the same height as the main board 20 or the antenna housing body 10. Heat that is generated from the PSU elements is discharged backward through the multiple heat dissipation pins 11 that are integrally provided on the back surface of the antenna housing body 10 or through PSU heat dissipation pins 16 of a PSU housing 15 that is formed separately from the antenna housing body 10 and that is attached to the back surface of the antenna housing body 10. Multiple RF filters 25 provided in a cavity filter type are disposed on the front surface of the main board 20. A back surface of the antenna board 30 is disposed to be stacked on a front surface of the multiple RF filters 25.

The patch type radiation elements or dipole type radiation elements 35 are mounted on a front surface of the antenna board 30. The radome 50 that protects each part therein against the outside and that facilitates radiation from the radiation elements 35 may be installed on the front surface of the antenna housing body 10.

However, an example 1 of the antenna apparatus according to a conventional technology has problems in that a heat dissipation area is inevitably limited by the area of the radome 50 because the front part of the antenna housing body 10 is shielded by the radome 50, and heat dissipation efficiency is greatly reduced because the radiation elements 35 are also designed to perform only the transmission and reception of RF signals, heat that is generated from the radiation elements 35 is not discharged forward, and heat that is generated within the antenna housing body 10 is inevitably uniformly discharged backward from the antenna housing body 10. There is an increasing need for a new heat dissipation structure design for solving such problems.

Furthermore, the example 1 of the antenna apparatus according to the conventional technology has a problem in that it is very difficult to implement a base station having a slim size, which is required in an in-building or 5G shadow area, due to the volume of the radome 50 and a volume that is occupied by a placement structure in which the radiation elements 35 are isolated from the front surface of the antenna board 30.

DISCLOSURE

Technical Problem

The present disclosure has been made to solve the technical problems, and has an object of providing an antenna apparatus having greatly improved heat dissipation performance by using both the front housing and rear housing of the antenna apparatus for front and back heat dissipation because a radome is removed and radiation elements are disposed in the front housing of the antenna apparatus.

Furthermore, the present disclosure has another object of providing an antenna apparatus capable of efficiently transferring heat within an antenna housing to the front of the antenna apparatus by using a filter as a heat transfer medium.

Furthermore, the present disclosure has still another object of providing an antenna apparatus which facilitates an implementation of a base station having a slim size, which is required in an in-building installation or 5G shadow area, because a front and rear volume occupied by a conventional radome can be reduced by deleting the radome.

Objects of the present disclosure are not limited to the aforementioned objects, and the other objects not described above may be evidently understood from the following description by those skilled in the art.

Technical Solution

An antenna apparatus according to the present disclosure includes one or more antenna placement units in which at least one radiation element is disposed on a front surface of the antenna placement unit, a front heat dissipation housing including a heat dissipation unit integrally formed between adjacent antenna placement units, among the one or more antenna placement units, exposed to the air, and configured to forward transfer heat that is generated from the back of the heat dissipation unit, and a rear heat dissipation housing coupled with the front heat dissipation housing and having a main board on which a filter for filtering an RF signal and an RF element are mounted provided within the rear heat dissipation housing, wherein heat that is generated from the filter is transferred to a front surface of the front heat dissipation housing through a contact with a back surface of the front heat dissipation housing by using the filter itself as a heat transfer medium.

Furthermore, an antenna apparatus according to the present disclosure includes multiple radiation elements configured to generate one polarized wave among dual polarized waves, a front heat dissipation housing, including multiple antenna placement units disposed to be spaced apart from each other so that the multiple radiation elements are disposed on front surfaces of the multiple antenna placement units, respectively, and a heat dissipation unit integrally formed between mutually adjacent antenna placement units, among the multiple antenna placement units, exposed to the air, and configured to forward transfer heat that is generated from the back of the heat dissipation unit, and a rear heat dissipation housing coupled with the front heat dissipation housing and having a main board on which a filter for filtering an RF signal and an RF element are mounted accommodated therein.

Furthermore, the radiation element may include an antenna patch circuit unit printed and formed on a printed circuit board for a radiation element that is disposed in the antenna placement unit, and a director for radiation made of a conductive metal material and electrically connected to the antenna patch circuit unit.

Furthermore, the director for radiation may induce the direction of a radiation beam in all directions and may also transfer heat that is generated from the back of the printed circuit board for a radiation element forward through thermal conduction.

Furthermore, the antenna apparatus may further include a PSU unit stacked and disposed in an internal space of the rear heat dissipation housing at a height identical with a height of the main board and including a PSU board on which multiple electronic elements including a PSU element are mounted and disposed on any one of a front or back surface of the PSU board. Heat that is generated from the back of the printed circuit board for a radiation element may be defined as heat that is generated from the filter and the multiple electronic elements.

Furthermore, the director for radiation may be made of a thermal conductive material capable of the thermal conduction.

Furthermore, a power feed line for supplying a power feed signal to the antenna patch circuit unit may be formed on an upper surface of the printed circuit board for a radiation element.

Furthermore, at least two antenna patch circuit units and the director for radiation may form one antenna module. The antenna module may further include an antenna module cover for sealing the antenna patch circuit unit other than the director for radiation, which has been exposed to the air, so that the antenna patch circuit unit is protected.

Furthermore, a through hole may be formed in one surface of the antenna module cover. The director for radiation may be coupled with a front surface of the antenna module cover in a way to be exposed to the air and electrically connected to the patch circuit unit through the through hole.

Furthermore, the antenna module cover may be injected and molded. A director fixing unit a shape of which is matched with a back surface of the director for radiation is provided on one surface of the antenna module cover, wherein at least one director fixing protrusion part capable of being coupled with the director for radiation is formed in the director fixing unit in a way to protrude forward. The director for radiation may be pressed and fixed to at least one director fixing groove that is depressed and formed at a location corresponding to the at least one director fixing protrusion part on the back surface of the director for radiation.

Furthermore, the antenna module cover may be injected and molded. A filter fixing hole for coupling with the filter may be formed in the antenna module cover through the antenna module cover.

Furthermore, the antenna module cover may be injected and molded. At least one board fixing hole for screw fastening by a fixing screw with the printed circuit board for a radiation element may be formed in the antenna module cover through the antenna module cover.

Furthermore, at least one fixing boss that is exposed to a back surface of the antenna module cover through the board fixing hole may be formed on a back surface of the director for radiation. The printed circuit board for a radiation element may be fixed to the back surface of the antenna module cover through an operation of the fixing screw being fastened to the fixing boss.

Furthermore, the fixing screw may be provided as a pan head screw a rear end surface of which is fastened to a front surface of the filter in a way to be matched with the back surface of the filter.

Furthermore, the antenna module cover may be injected and molded. At least one reinforcement rib may be integrally formed on one surface of the antenna module cover.

Furthermore, at least four location setting holes may be formed in the printed circuit board for a radiation element. At least two location setting protrusions formed on a back surface of the antenna module cover that has been provided to cover a front surface of the printed circuit board for a radiation element may be pressed and inserted into two location setting holes, among the four location setting holes. At least two location setting protrusions formed on the front surface of the front heat dissipation housing that has been provided so that a back surface of the printed circuit board for a radiation element is closely attached to the front heat dissipation housing may be pressed and inserted into two location setting holes, among the four location setting holes.

Furthermore, a thermal pad may be interposed between the filter and the back surface of the front heat dissipation housing.

Furthermore, a field programmable gate array (FPGA) may be disposed on an upper surface of the main board. Heat that is generated from the FPGA may be transferred to the heat dissipation unit in front of the front heat dissipation housing through the back surface of the front heat dissipation housing.

Furthermore, the heat that is generated from the FPGA may be transferred through the medium of any one of a heat pipe or vapor chamber that connects the FPGA and the back surface of the front heat dissipation housing.

Furthermore, a clamshell that performs a signal blocking function may be formed integrally with a rear end part of the filter. Heat that is generated within the filter shielded by the clamshell may be discharged backward through the rear heat dissipation housing.

Furthermore, the filter may be fixed to the main board through the medium of a pipe for fixing which is formed at an end of the clamshell in a way to protrude backward and has a shape an inside of which is empty. A heat discharge via hole that communicates with the pipe for fixing may be formed in the main board.

Furthermore, the heat discharge via hole may be plated with a thermal conductive material.

Furthermore, the front heat dissipation housing may be made of a metal material. The one or more antenna placement units may be disposed to be exposed to the air. Some of heat that is generated forward from the main board as the back of the front heat dissipation housing may be discharged forward through the medium of the at least one radiation element, and a remainder of the heat may be discharged forward through the medium of the front heat dissipation housing. Heat that is generated backward from the main board may be discharged backward through the medium of the rear heat dissipation housing.

Advantageous Effects

In accordance with an embodiment of the antenna apparatus according to the present disclosure, the following various effects can be achieved.

First, there is an effect in that heat dissipation performance is greatly improved because the radome, that is, an obstacle to heat dissipation in front of the antenna apparatus, is removed, the radiation elements are disposed in the front heat dissipation housing of the antenna apparatus in a way to be exposed to the air, and heat dissipation from the front and back of the antenna apparatus is possible.

Second, there is an effect in that a manufacturing unit price of a product is greatly reduced because the radome that was an essential component of a conventional antenna apparatus can be removed.

Third, there is an effect in that heat dissipation performance is greatly improved because system heat within the antenna housing body can be discharged forward by the area of the heat dissipation cover, which is increased due to the deletion of the radome.

Fourth, there is an effect in that a slim design of a product is generally easy because overall heat dissipation toward the front is possible and the length of the heat dissipation pins of the rear heat dissipation housing can be reduced.

Fifth, there is an effect in that a heat dissipation area of the front heat dissipation housing can be maximized because heat can also be discharged through the medium of the director for radiation that belongs to the antenna module and that performs a radiation function for electromagnetic waves.

Effects of the present disclosure are not limited to the aforementioned effects, and other effects not described above may be evidently understood by those skilled in the art from the writing of the claims.

DESCRIPTION OF REFERENCE NUMERALS

Figure 1:
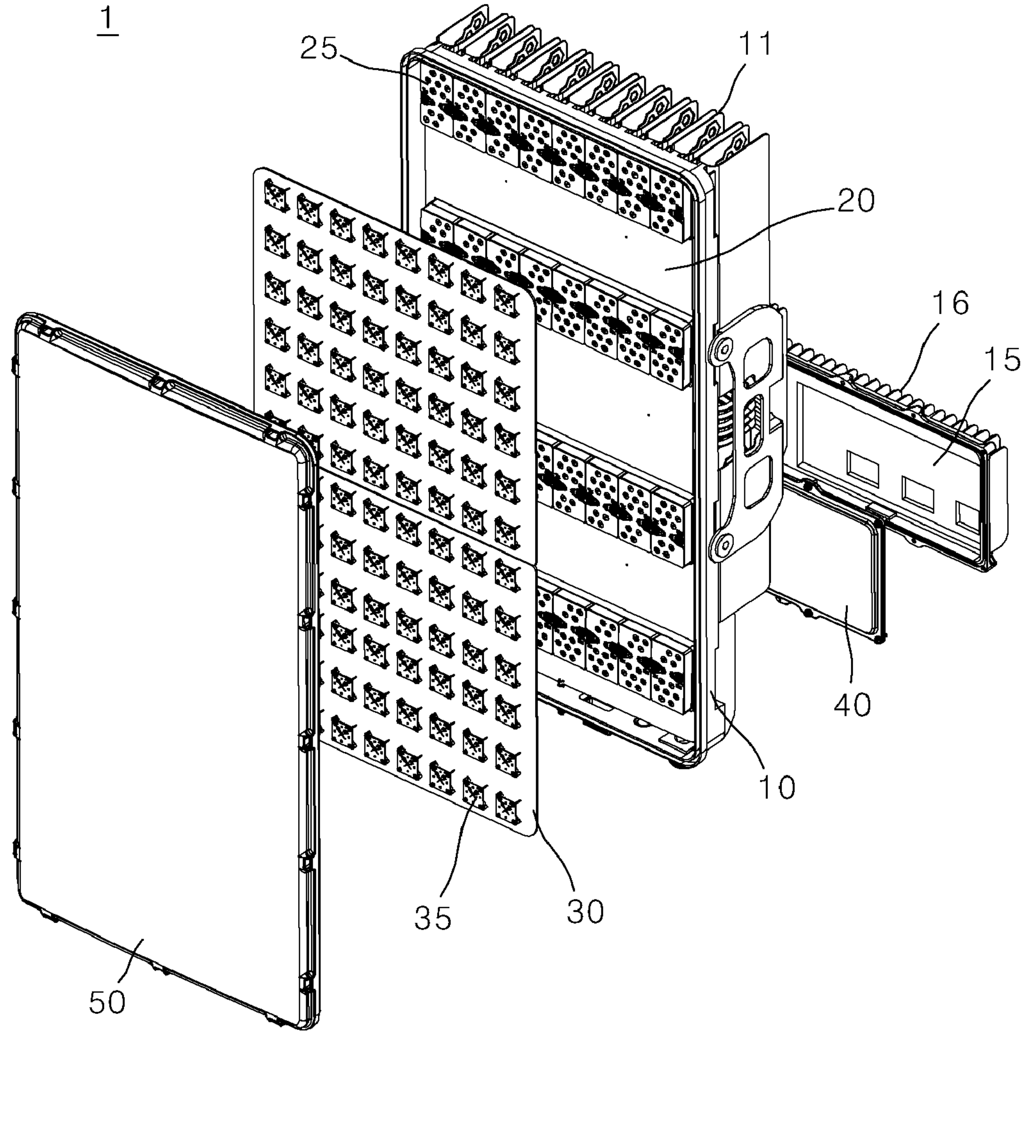
FIG. 1 is an exploded perspective view illustrating an example of an antenna apparatus according to a conventional technology.

| | |
|---|---|
| 1: | antenna apparatus |
| 100: | front heat dissipation housing |
| 110: | antenna module |
| 115: | printed circuit board |
| 116: | antenna patch circuit unit |
| 117: | director |
| 150: | heat dissipation unit |
| 170: | antenna placement unit |
| 178: | director fixing hole |
| 180: | fixing screw |
| 200: | rear heat dissipation housing |
| 201: | rear heat dissipation pin |
| 320: | main board |
| 350: | filter |

BEST MODE

Hereinafter, an antenna apparatus according to an embodiment of the present disclosure is described in detail with reference to the accompanying drawings.

In adding reference numerals to the components of each drawing, it should be noted that the same components have the same reference numerals as much as possible even if they are displayed in different drawings. Furthermore, in describing embodiments of the present disclosure, when it is determined that the detailed description of the related well-known configuration or function may obscure the gist of the present disclosure, the detailed description thereof will be omitted.

Furthermore, in describing components of an embodiment of the present disclosure, terms, such as a first, a second, A, B, (a), and (b), may be used. Such terms are used only to distinguish one component from another component, and the essence, order, or sequence of a corresponding component is not limited by the terms. All terms used herein, including technical or scientific terms, have the same meanings as those commonly understood by a person having ordinary knowledge in the art to which the present disclosure pertains, unless defined otherwise in the specification. Terms, such as those commonly used and defined in dictionaries, should be construed as having the same meanings as those in the context of a related technology, and are not construed as having an ideal meaning or an excessively formal meaning unless explicitly defined otherwise in the specification.

Figure 2:
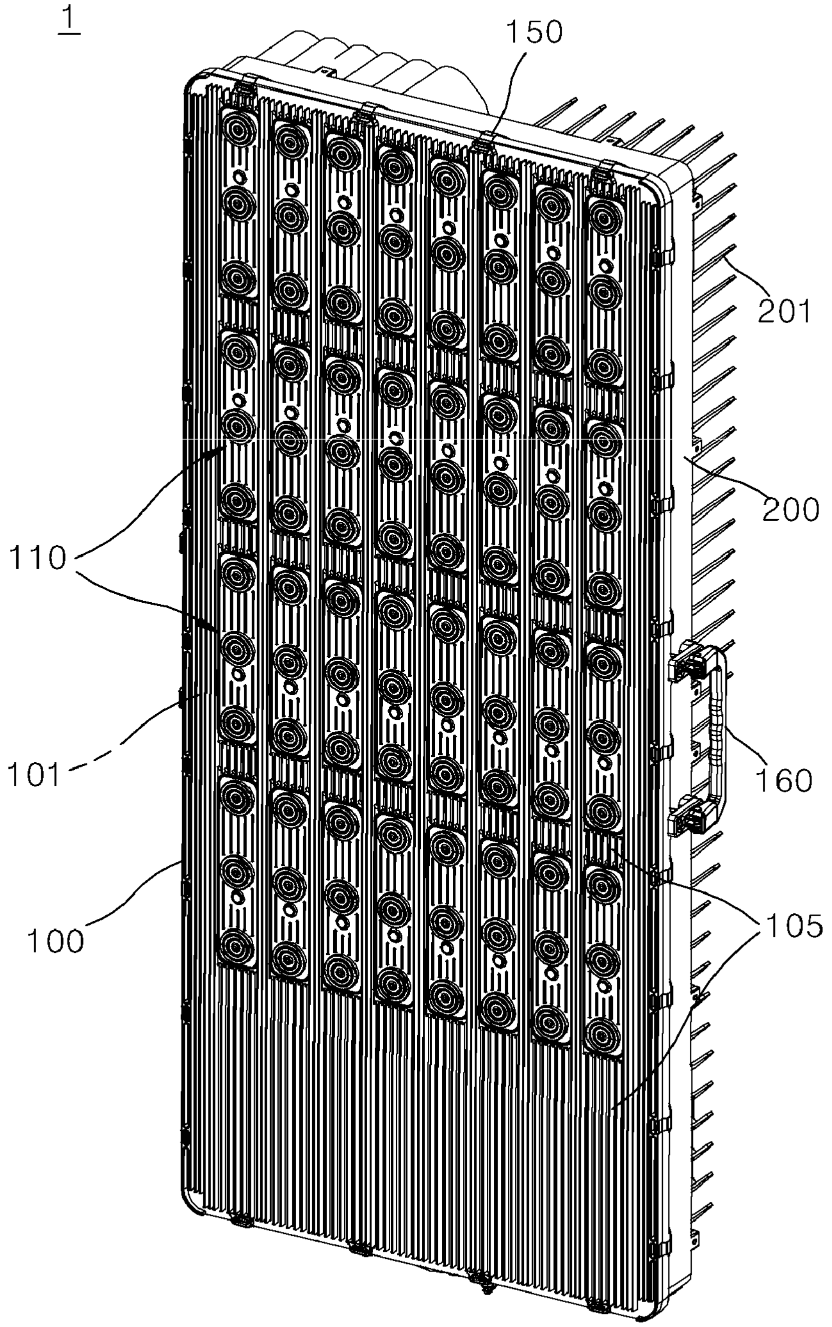
FIG. 2 is a front perspective view of the antenna apparatus according to an embodiment of the present disclosure.
Figure 3A:
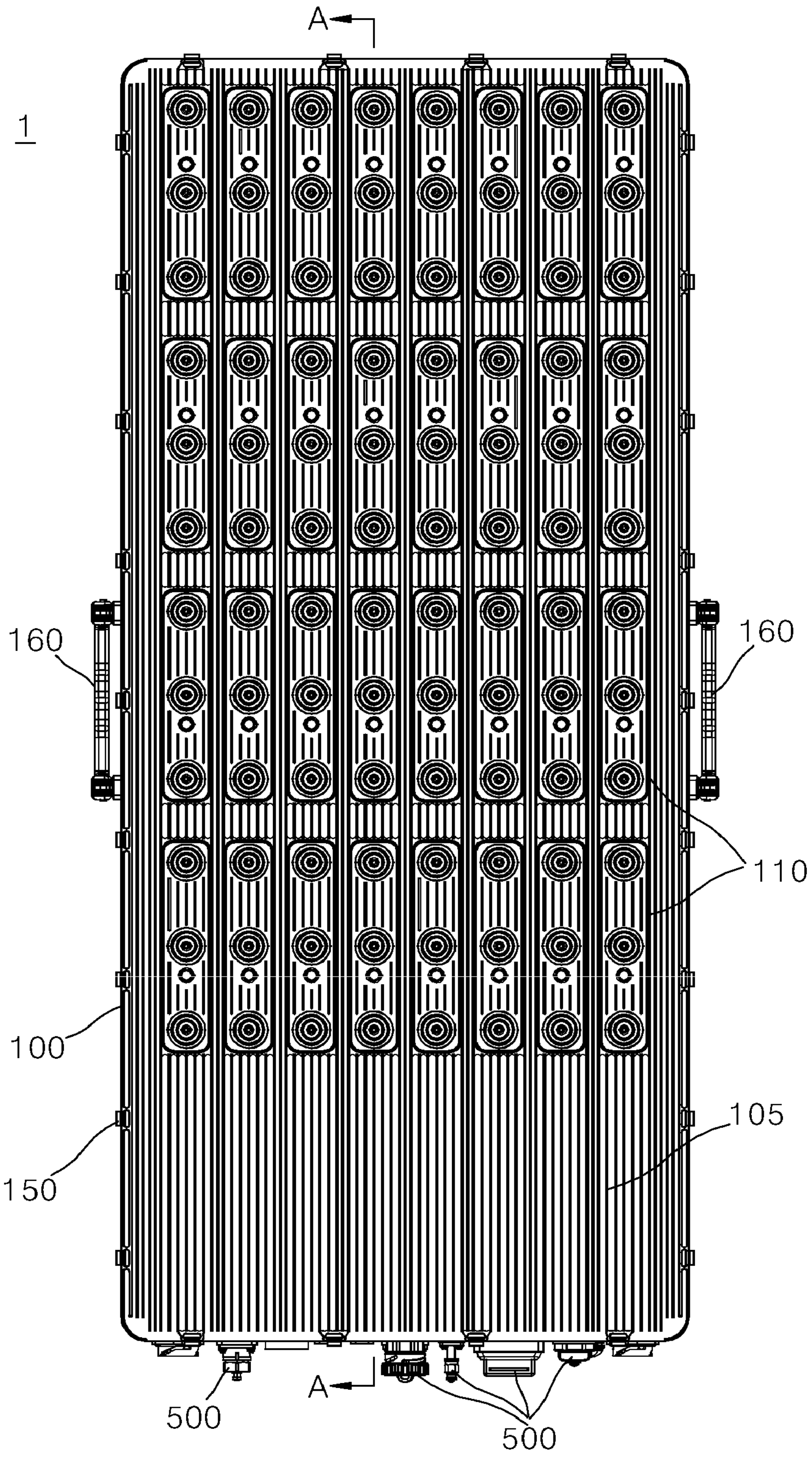
FIGS. 3*a* and 3*b* are a front view and rear view of the antenna apparatus according to an embodiment of the present disclosure.
Figure 3B:
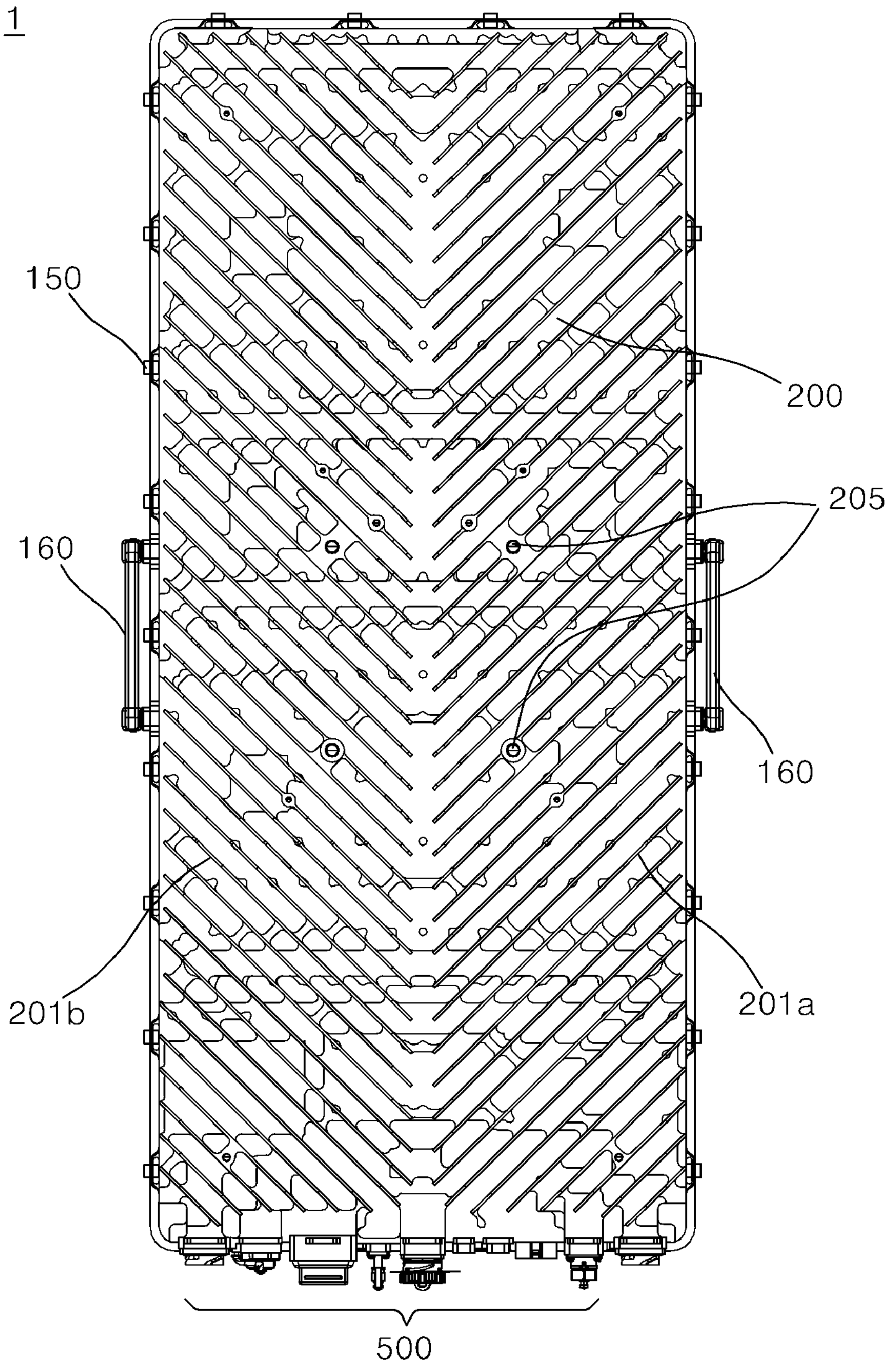
Figure 4:
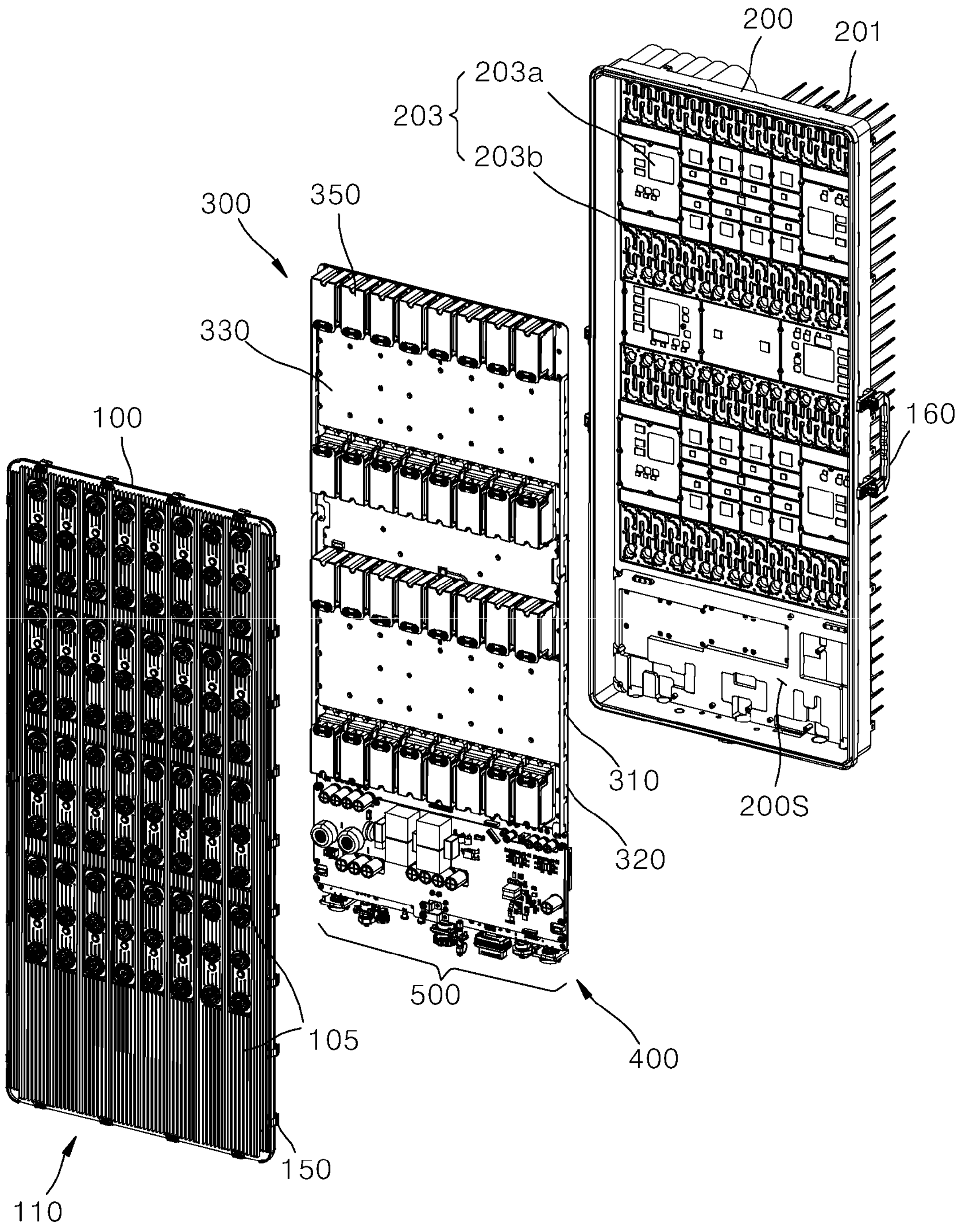
FIG. 4 is an exploded perspective view illustrating an internal space of the antenna apparatus illustrated in FIG. 2.
Figure 5:
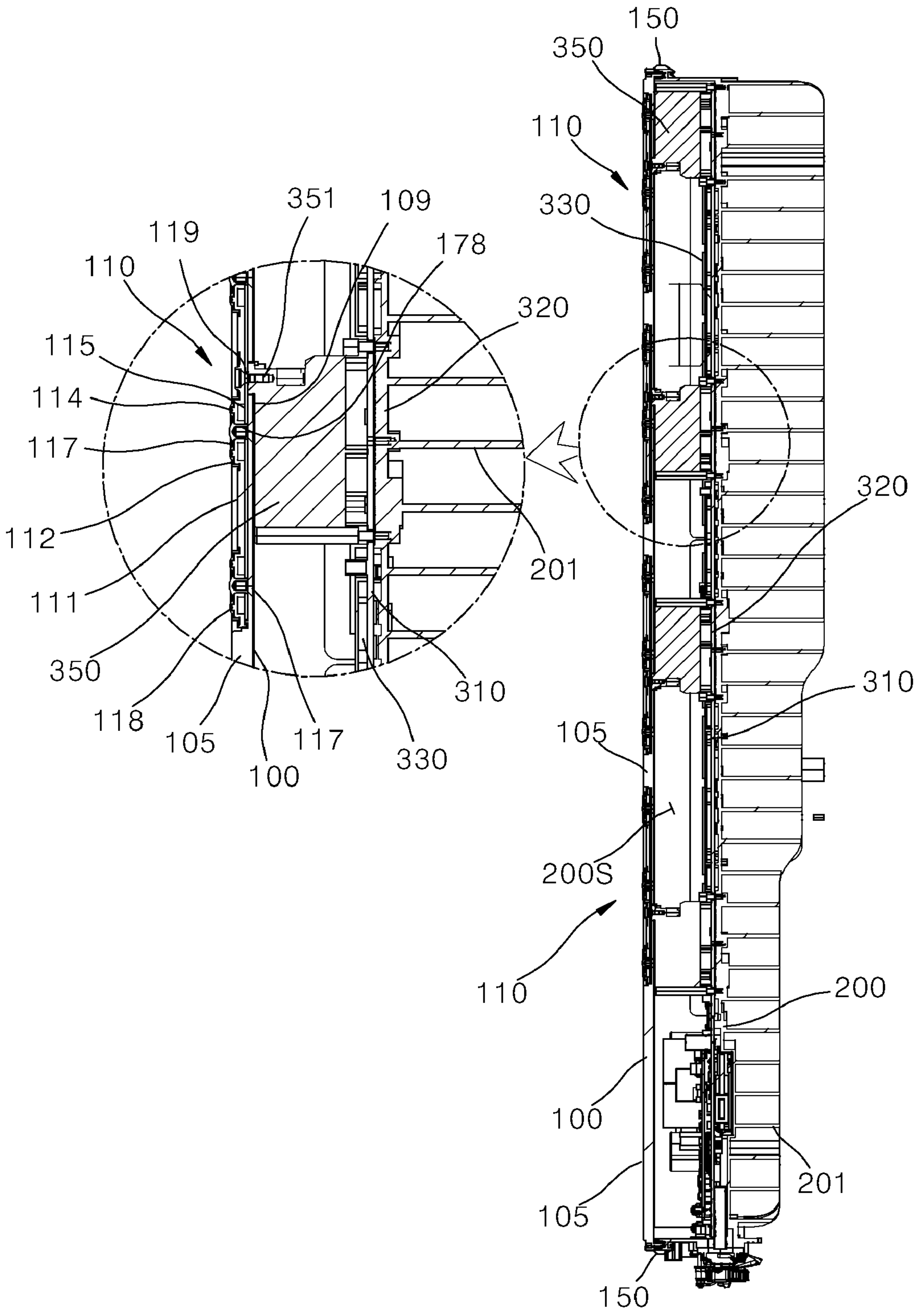
FIG. 5 is a cross-sectional view taken along line A-A in FIG. 3*a* and a partially enlarged view thereof.

FIG. 2 is a front perspective view of the antenna apparatus according to an embodiment of the present disclosure. FIGS. 3*a* and 3*b* are a front view and rear view of the antenna apparatus according to an embodiment of the present disclosure. FIG. 4 is an exploded perspective view illustrating an internal space of the antenna apparatus illustrated in FIG. 2. FIG. 5 is a cross-sectional view taken along line A-A in FIG. 3*a* and a partially enlarged view thereof.

As referred to in FIG. 2, an antenna apparatus 1 according to an embodiment of the present disclosure includes a front heat dissipation housing 100 that forms an outward appearance of the front of the antenna apparatus 1 and a rear heat dissipation housing 200 that forms an outward appearance of the back of the antenna apparatus 1. In this case, the front heat dissipation housing 100 includes an antenna placement unit (refer to reference numeral "170" in FIG. 14 described later) in which at least one radiation element 116 and 117 is disposed on a front surface thereof and a heat dissipation unit 105 that is exposed to the air and that forward transfers heat that is generated from the back thereof. In particular, one or more antenna placement units 170 may be integrally formed on a front surface of the front heat dissipation housing 100 and disposed to be spaced apart from each other. The heat dissipation unit 105 may be formed with respect to the entire area of the front surface of the front heat dissipation housing 100 so that the heat dissipation unit 105 fills the space between adjacent antenna placement units 170.

Referring to FIGS. 2 to 5, the front heat dissipation housing 100 is provided as a metal material having excellent thermal conductivity so that the front heat dissipation housing 100 can directly discharge heat that is generated between the front heat dissipation housing 100 and the rear heat dissipation housing 200 described later forward. As described above, the front surface of the front heat dissipation housing 100 may be basically divided into the antenna placement unit 170 and the heat dissipation unit 105 in terms of its outward appearance.

In this case, the remaining space except the antenna placement unit 170 basically performs a function as the heat dissipation unit 105. The heat dissipation unit 105 has a multi-heat dissipation pin form, and is formed integrally with the front heat dissipation housing 100 so that the heat dissipation unit 105 has a predetermined pattern shape. Heat that is generated from an internal space between the front heat dissipation housing 100 and the rear heat dissipation housing 200 can be rapidly discharged forward through the heat dissipation unit 150 provided in the multi-heat dissipation pin form.

That is, the embodiment 1 of the antenna apparatus according to the present disclosure proposes a heat dissipation structure having a new concept, which discharges heat in all directions of the antenna apparatus 1 by improving the structure in which the discharge of heat to the front of the antenna apparatus 1 was limited, compared to a conventional technology including the radome.

More specifically, the embodiment 1 of the antenna apparatus according to the present disclosure can change an area that was occupied by the existing radome into a heat discharge area by introducing the front heat dissipation housing 100.

The front heat dissipation housing 100 changes, into an available area capable of heat discharge, the entire area of the heat dissipation unit 105 except at least the area that was occupied by an antenna module 110 described later. Furthermore, an available area for more heat discharge can be secured by including the director 117 for radiation, among the components of the antenna module 110, as a metal material capable of thermal conduction.

As referred to in FIG. 3*a*, the front heat dissipation housing 100 has a shape that covers the front end part of a rectangular parallelepiped inclusion body of the rear heat dissipation housing 200 described later, and may be provided approximately in the form of a rectangular plate body.

The antenna placement unit 170 with which the multiple antenna modules 110 described later are coupled may be flatly formed on the front surface of the front heat dissipation housing 100.

The multiple antenna placement units 170 are formed to be matched with outward appearances of the multiple antenna modules 110, and are each provided in the form of a rectangular plate body in which each of the multiple antenna modules 110 is elongated in up and down directions. The antenna modules 110 are lined and disposed to be spaced apart from each other in the horizontal direction and in up and down directions at predetermined intervals. The multiple antenna placement units 170 may also be disposed on the front surface of the front heat dissipation housing 100 in the same shape.

In this case, the multiple antenna placement units 170 may not be formed on the lower side of the rear heat dissipation housing 200 described later in an internal space thereof so that heat generated from multiple PSU elements 417 of a PSU unit 400 described later can be directly discharged forward easily through the aforementioned heat dissipation unit 105.

The aforementioned heat dissipation unit 105 may be formed in portions corresponding to the remaining areas that belong to the front surface of the front heat dissipation housing 100 and that are not occupied by the multiple antenna placement units 170 so that the portions are filled with the heat dissipation unit 105 in the multi-heat dissipation pin form. In this case, the heat dissipation unit 105 may have a shape enough to increase a heat dissipation area through the front heat dissipation housing 100, unlike in a case in which a shape design in which multiple rear heat dissipation pins 201 formed integrally with the rear heat dissipation housing 200 described later distribute or rapidly discharge the updraft of backward heat that has been discharged has been considered. That is, the heat dissipation unit 105 does not need to essentially have a shape for distributing or rapidly discharging the updraft of forward heat that has been discharged (however, such a shape can increase heat dissipation performance), and may adopt any shape as far as a surface area of the front heat dissipation housing 100 is increased.

The rear heat dissipation housing 200 is coupled with the front heat dissipation housing 100 to form an outward appearance of the back of the entire antenna apparatus 1. A main board 310 on which multiple filters 350 for filtering an RF signal and multiple RF elements (reference numerals not indicated) related to the multiple filters are mounted is provided within the rear heat dissipation housing 200. The rear heat dissipation housing 200 is generally provided as a metal material having excellent thermal conductivity so that heat dissipation according to thermal conduction is advantageous, but may be formed approximately in a rectangular parallelepiped inclusion body shape having a thin thickness in forward and backward directions and may have a front surface formed to be opened. An internal space 200S in which the main board 310 having the multiple RF filters 350, various RF elements, a field programmable gate array (FPGA) 317, etc. mounted thereon is installed may be formed within the rear heat dissipation housing 200.

Referring to FIG. 3*b*, the multiple rear heat dissipation pins 201 may be integrally with formed on a back surface of the rear heat dissipation housing 200 so that the multiple rear heat dissipation pins 201 have a predetermined pattern shape. Heat that is generated from a rear part side that belongs to the internal space 200S of the rear heat dissipation housing 200 may be directly discharged backward through the multiple rear heat dissipation pins 201.

The multiple rear heat dissipation pins 201 may be disposed to be upward inclined toward left and right ends thereof on the basis of a central part thereof in a left and right width thereof (refer to reference numerals 201*a* and 201*b* in FIG. 3*b*). The multiple rear heat dissipation pins may be designed so that heat discharged backward from the rear heat dissipation housing 200 forms updrafts that are distributed in the left and right directions of the rear heat dissipation housing 200, respectively, so that the heat can be distributed more rapidly. However, a shape of the heat dissipation pin 201 is not limited to such a design. Although not illustrating in the drawings, if a ventilation fan module (not illustrated) is provided on the back surface of the rear heat dissipation housing 200, it may be preferred that the rear heat dissipation pins are formed in parallel on the left and right ends of the ventilation fan module that is disposed at the center of the rear heat dissipation pins so that heat discharged by the ventilation fan module is discharged more rapidly.

Furthermore, although not illustrated, a bracket mounting unit 205 with which a clamping device (not illustrated) for combining the antenna apparatus 1 with a support pole (not illustrated) is coupled may be formed integrally with some of the multiple rear heat dissipation pins 201. In this case, the clamping device may be a component for adjusting the direction of the antenna apparatus 1 by rotating the antenna apparatus 1 according to an embodiment of the present disclosure, which has been installed at a front end of the clamping device, in the horizontal direction or tilting and rotating the antenna apparatus 1 in up and down directions.

Meanwhile, heat that is generated from the surroundings of the multiple filters 350, as spaces between a back surface of the front heat dissipation housing 100 and the rear heat dissipation housing 200, is transferred to the front surface of the front heat dissipation housing 100 by directly using the front heat dissipation housing 100 as a heat transfer medium or through a contact with the back surface of the front heat dissipation housing 100 using the filter 350 as a heat transfer medium. Furthermore, some of heat that is generated within the multiple filters 350 may be directly discharged backward through the rear heat dissipation housing 200, which is described more specifically later.

A clamshell in which the multiple RF filters 350 perform a blocking and interference function on external electromagnetic waves may be formed on the front surface of the rear heat dissipation housing 200 in an integrated type, and the multiple RF filters 350 may be mounted and arranged at preset locations of the main board 310.

The antenna apparatus 1 according to an embodiment of the present disclosure adopts a configuration in which a total of eight multiple RF filters 350 have been adjacently arranged in the horizontal direction and a total of four columns of such multiple RF filters 350 have been disposed in up and down directions, but the present disclosure is not essentially limited thereto. It may be said to be natural that arrangement locations of the multiple RF filters and the number of RF filters 170 may be variously designed and deformed.

Although not illustrating in the drawings, each of the multiple RF filters 350 may be adopted and disposed as a cavity filter that has multiple cavities provided therein and that filters a frequency band of an input signal versus an output signal by adjusting a frequency using the resonator of each cavity. However, the RF filter 350 is not essentially limited to the cavity filter, and does not exclude a ceramic waveguide filter.

The RF filter 350 is advantageous in a slimness implementation design of the entire product when the thickness of the RF filter in forward and backward directions is small. In the slimness design aspect of such a product, the ceramic waveguide filter that is advantageous for a small size design, compared to the cavity filter having a limited reduction design in the front and back thickness, may be considered to be adopted for the RF filter 350. However, in order to satisfy high output performance of a base station antenna that is required for a 5G frequency environment, an antenna heat dissipation problem accompanied by the high output performance must be solved. In order to effectively discharge heat that is generated within the antenna, the adoption of the cavity filter may be preferred in that heat that is generated from the filter 350 can be transferred to the front surface of the front heat dissipation housing 100 by using the RF filter 350 as a heat transfer medium.

Heat that is generated from the RF filter 350 may be transferred to the front surface of the front heat dissipation housing 100 through a contact with the back surface of the front heat dissipation housing 100. A thermal pad 109 may be interposed between the filter 350 and the back surface of the front heat dissipation housing 100.

The thermal pad 109 performs a function for smoothly transferring heat that is generated from the filter 350 through a surface contact with the front heat dissipation housing 100 and also performs a function for solving clearance upon assembly between the filter 350 and the front heat dissipation housing 100.

As referred to in FIG. 4, an inner side that forms the internal space 200S of the rear heat dissipation housing 200 may be formed in a form in which shapes of the main board 310 and a back portion of a subboard 320 described later are matched with each other. That is, heat dissipation performance can be improved by increasing a thermal contact area between the main board 310 and the back surface of the subboard 320.

A handle unit 160 which may be held by a worker on the spot in order to carry the antenna apparatus 1 according to an embodiment of the present disclosure or to easily mount the antenna apparatus on the support pole (not illustrated) may be further installed on both sides of the rear heat dissipation housing 200 on left and right sides thereof.

Furthermore, various outer mounting members 500 for a cable connection with a base station apparatus not illustrated and the coordination of an internal part may be penetrated and assembled at the lower end part of the rear heat dissipation housing 200 on the outside thereof.

Figure 6A:
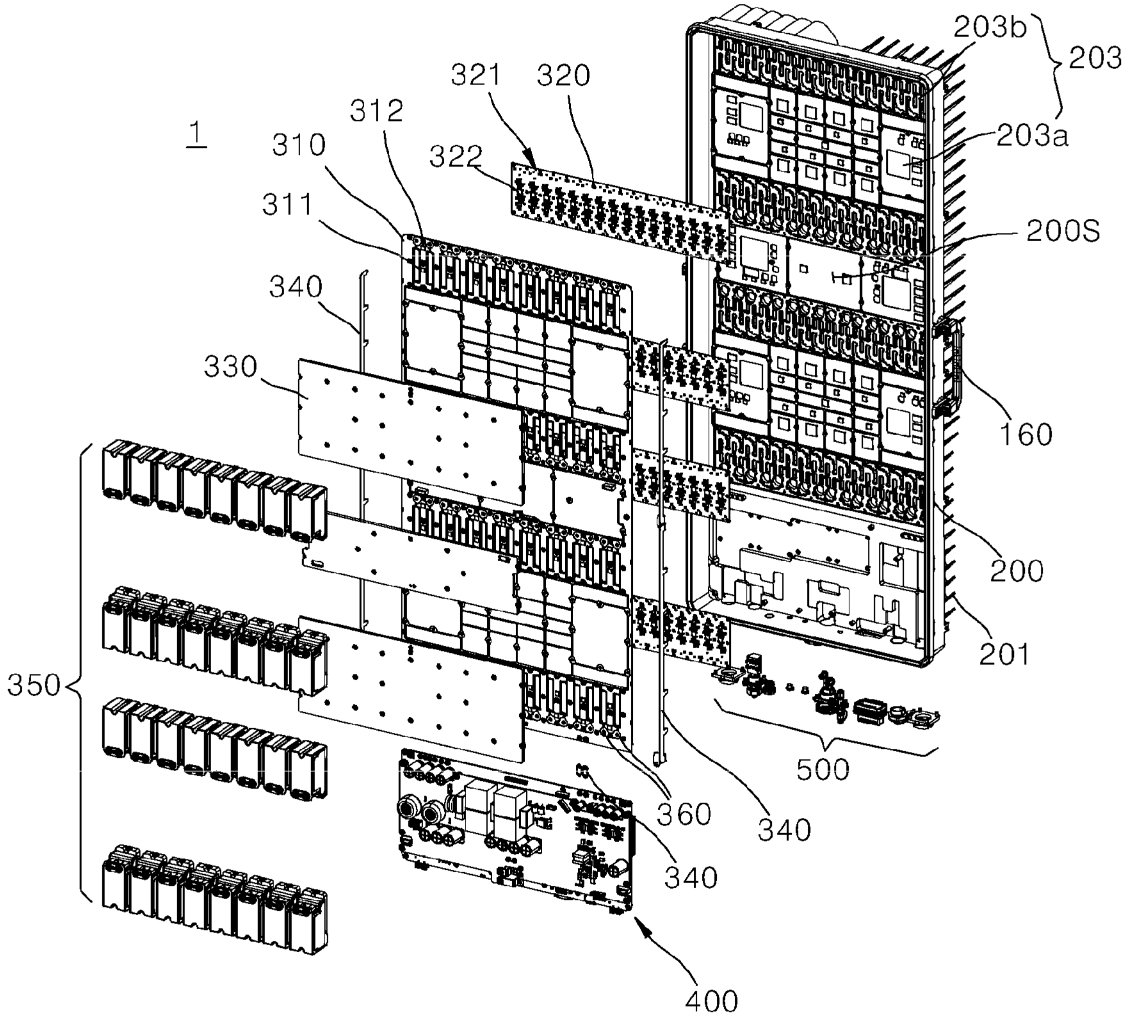
FIGS. 6*a* and 6*b* are front-side and rear-side exploded perspective views of a main board and a filter which are stacked in an internal space of a rear heat dissipation housing, among components of FIG. 2.
Figure 6B:
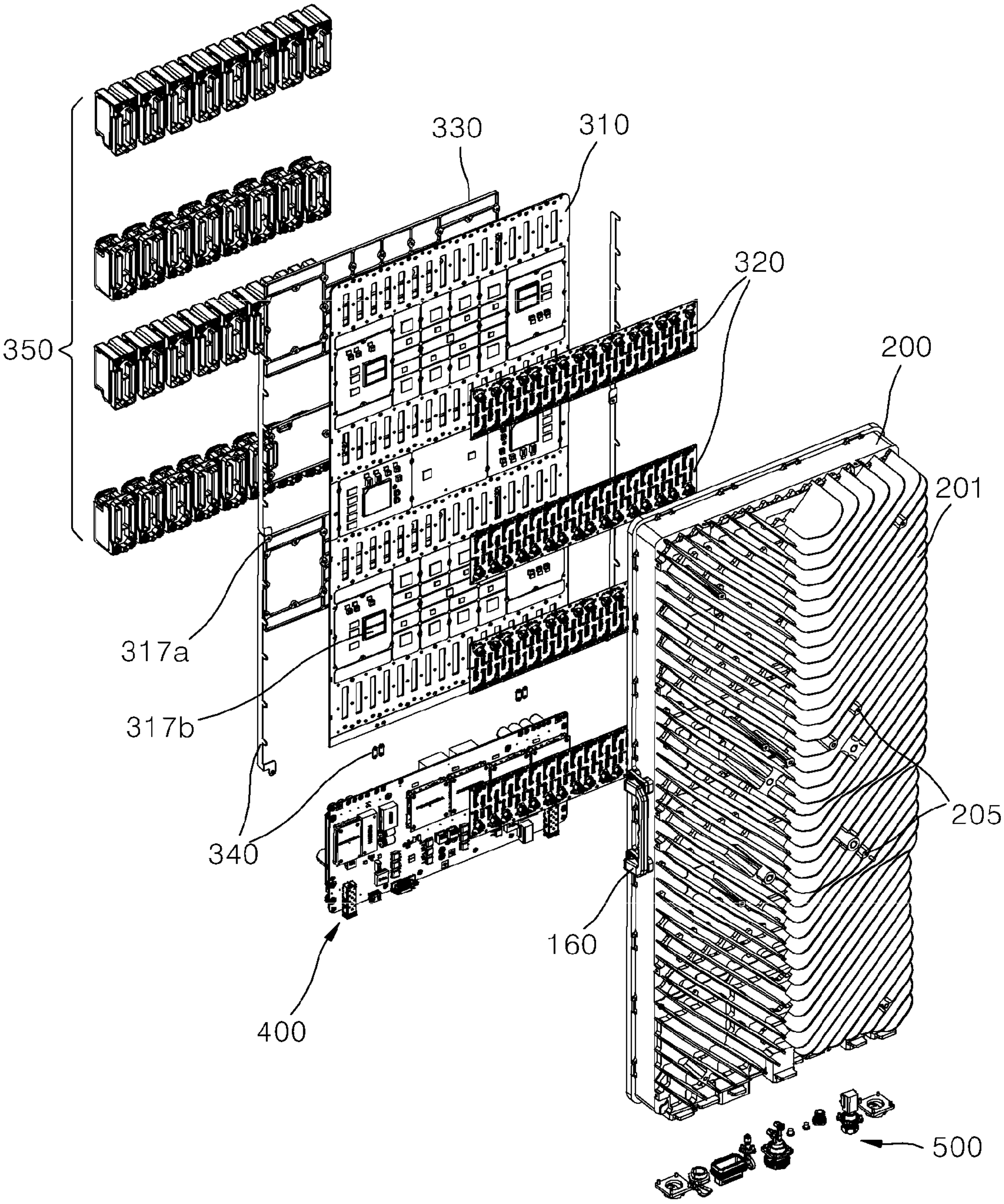
Figure 7:
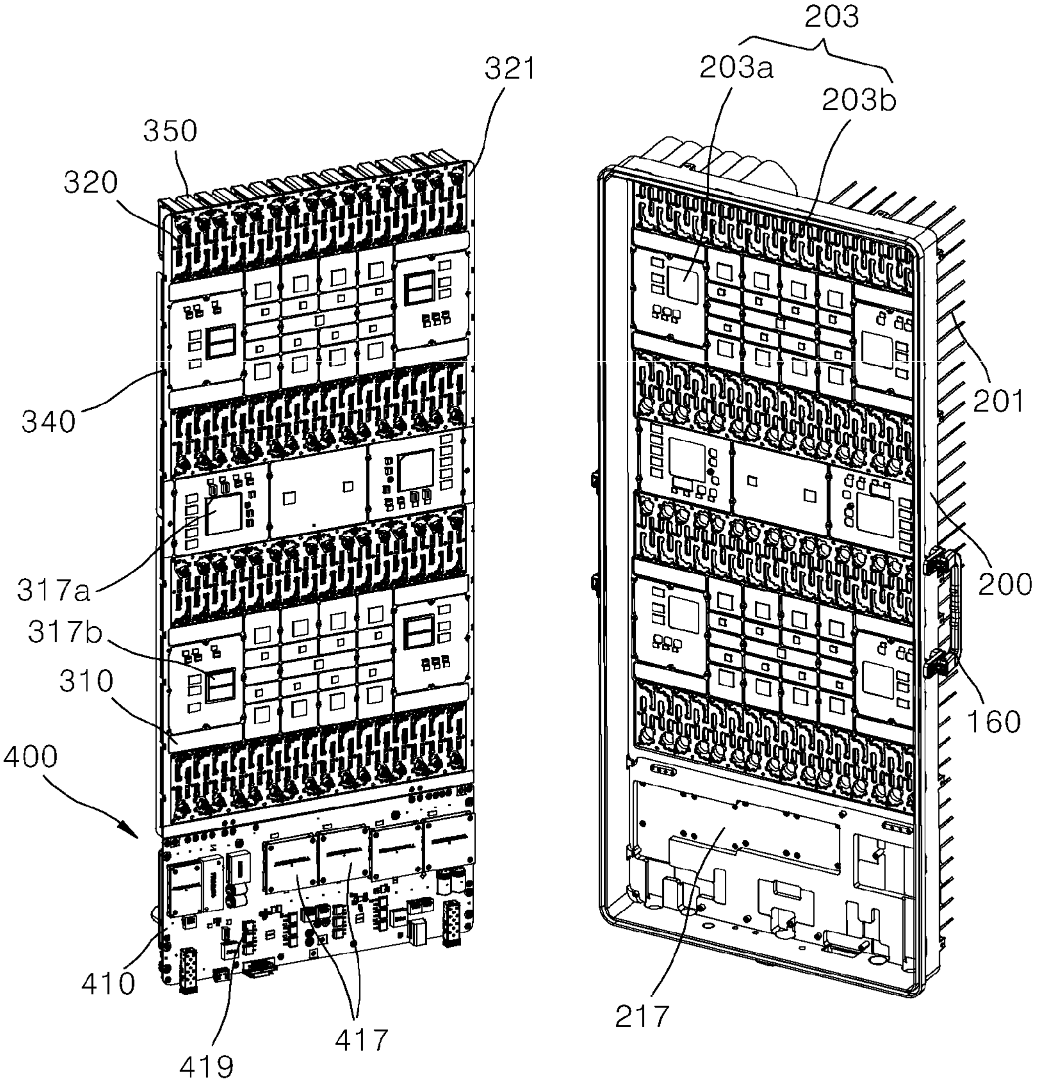
FIG. 7 is an exploded perspective view illustrating a direct backward heat dissipation structure through the rear heat dissipation housing, among the components of FIG. 2.
Figure 8A:
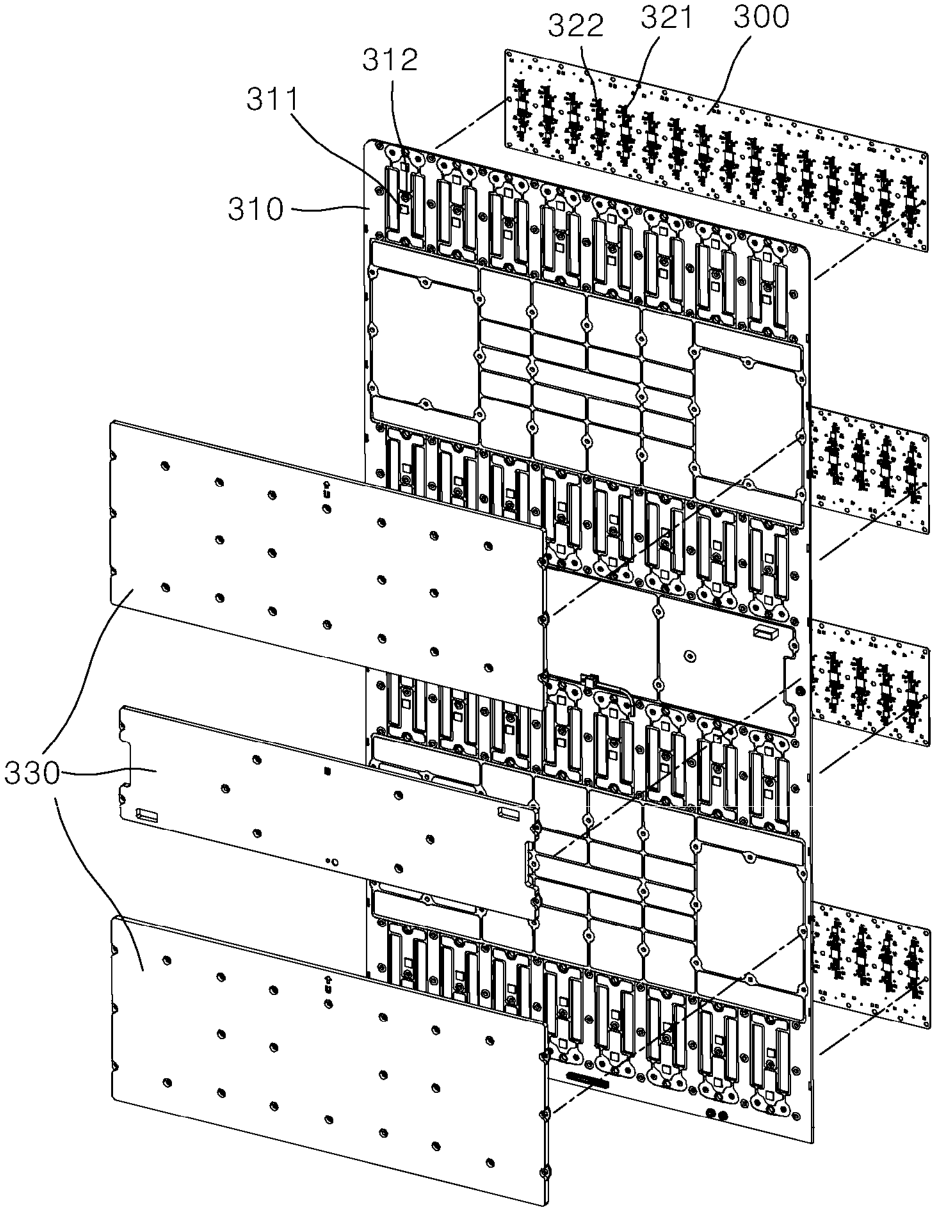
FIGS. 8*a* and 8*b* are front-side and rear-side exploded perspective views illustrating an installation form of a subboard and a shielding panel for a main board, among the components of FIG. 2.
Figure 8B:
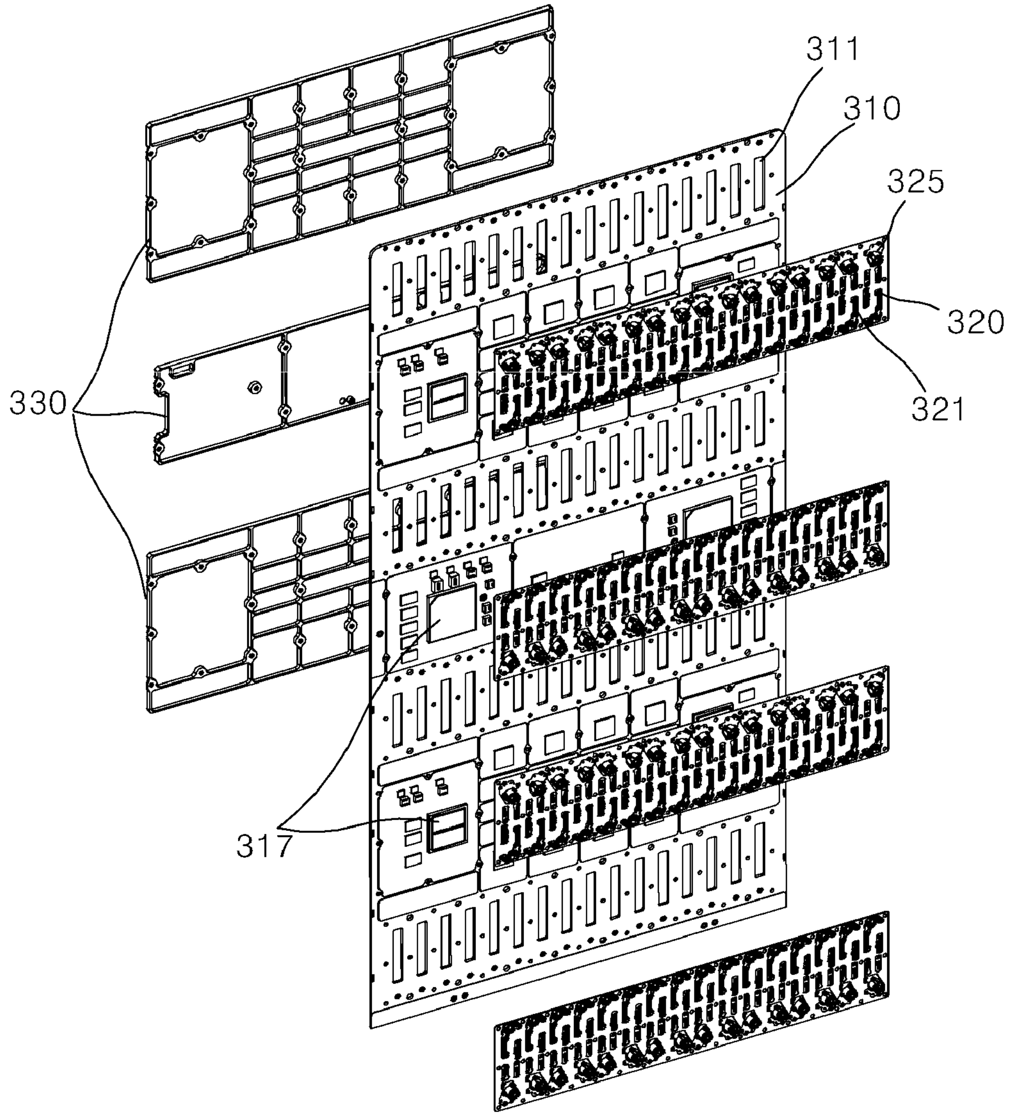
Figure 9:
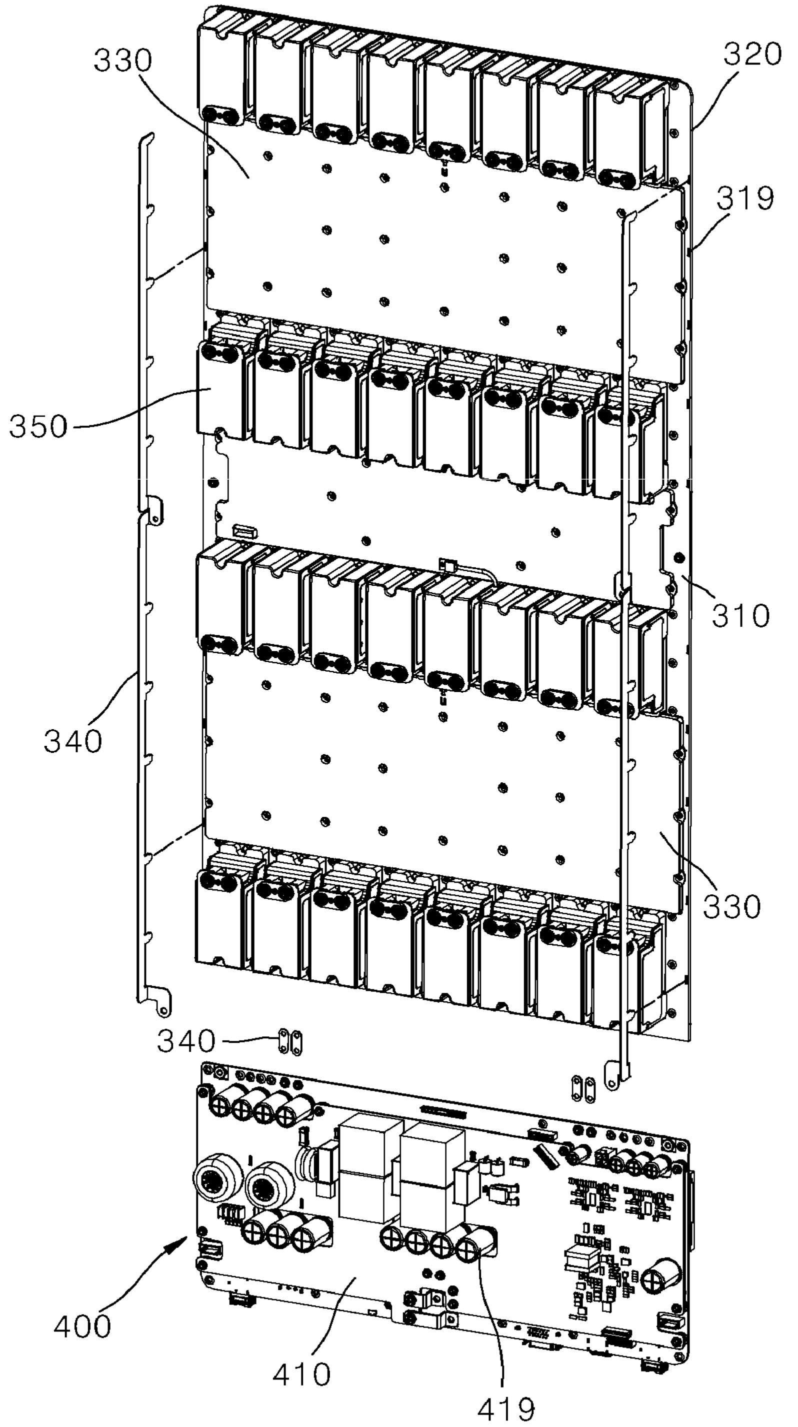
FIG. 9 is an exploded perspective view for describing an electrical connection form of a PSU unit for the main board, among the components of FIG. 2.

FIGS. 6*a* and 6*b* are front-side and rear-side exploded perspective views of the main board and the filter which are stacked in the internal space of the rear heat dissipation housing, among components of FIG. 2. FIG. 7 is an exploded perspective view illustrating a direct backward heat dissipation structure through the rear heat dissipation housing, among the components of FIG. 2. FIGS. 8*a* and 8*b* are front-side and rear-side exploded perspective views illustrating an installation form of the subboard and a shielding panel for the main board, among the components of FIG. 2. FIG. 9 is an exploded perspective view for describing an electrical connection form of the PSU unit for the main board, among the components of FIG. 2.

As referred to in FIGS. 6*a* and 6*b*, the antenna apparatus 1 according to an embodiment of the present disclosure may include an antenna stack assembly 300 that is stacked and disposed in the internal space 200S of the rear heat dissipation housing 200.

As referred to in FIGS. 6*a* and 6*b*, the antenna stack assembly 300 is an RF filter that is stacked on a front surface of the main board 310, and may include the multiple filters 350 and the subboard 320 that is stacked on a back surface of the main board 310.

Although not illustrated, the main board 310 may be stacked and provided in the form of multiple layers. A power feed circuit for power feed to the multiple filters 350 may be patternized and printed on the inside or surface of the main board 310. In particular, an LNA element 312, among multiple power feed parts, may be mounted on the front surface of the main board 310. Multiple power feed connectors 360 for a power feed connection to the multiple filters 350 may be inserted and mounted on the front surface of the main board 310.

Meanwhile, as in the main board 310, a pair of power feed circuits 321 for power feed to the multiple filters 350 may be patternized and printed on the front surface of the subboard 320 as each of a transmission path and a reception path. A PA element 322, among the multiple power feed parts, may be mounted on the front surface of the subboard 320.

In this case, multiple penetration units 312 may be processed and formed in the main board 310 so that the power feed circuit 321 and the PA element 322 on the front surface of the subboard 320, among the components of the subboard 320 stacked on the back surface of the main board 310, are exposed to the rear surface side of the multiple filters 350.

Furthermore, as described above, a clamshell (reference numeral not indicated) is formed integrally with the rear end side of the multiple filters 350. A predetermined air layer may be formed between the rear end side of the multiple filters 350 and the main board 310 and between the rear end side of the multiple filters 350 and the subboard 320. Heat that is generated from the LNA element 312 and the PA element 322, that is, representative heat dissipation elements, can be discharged toward the rear heat dissipation housing 200 through a heat discharge via hole (refer to reference numeral "357*a*" in FIG. 11) that is formed in the main board 310.

As referred to in FIG. 7, multiple FPGA elements 317*a* and RFIC elements 317*b*, that is, representative ones of heat dissipation elements, may be mounted and disposed on the back surface of the main board 310. The multiple FPGA elements 317*a* and the multiple RFIC elements 317*b* are semiconductor devices that discharge a large amount of heat upon driving thereof, and are adopted as a structure in which the multiple FPGA elements and the multiple RFIC elements have direct and thermal surface contact with the inner side of the internal space 200S of the rear heat dissipation housing 200 and discharge heat backward through the rear heat dissipation housing 200.

More specifically, as referred to in FIG. 7, a thermal contact accommodation surface 203*a* with which surfaces of the multiple FPGA elements 317*a* and RFIC elements 317*b* have direct and thermal contact is formed on the inner side of the rear heat dissipation housing 200 in a way to protrude forward. Furthermore, a thermal contact groove 203*b* in which multiple protrusion parts patternized, printed, and mounted on the back surface side of the subboard 320 in an embossing form are accommodated may be depressed and formed backward on the inner side of the rear heat dissipation housing 200. Accordingly, there is an advantage in that heat dissipation performance is greatly improved because both the back surfaces of the main board 310 and of the subboard 320 have thermal surface contact with the inner side of the rear heat dissipation housing 200.

As referred to in FIGS. 8*a* and 8*b*, a shielding pad 330 may be stacked and coupled with the remaining part of the front surface of the main board 310 except a portion that is occupied by the multiple filters 350. The shielding pad 330 is a shielding member that is disposed between the main board 310 and the front heat dissipation housing 100 and that secures more stable signal performance by blocking the influence of a signal attributable to an electronic part of the remaining portion except an electrical signal line through the multiple filters 350 or external electromagnetic waves.

The antenna apparatus 1 according to an embodiment of the present disclosure may further include a PSU unit 400 for supplying power to the multiple filters 350 and the antenna module 110, as referred to in FIGS. 6*a*, 6*b*, and 7.

As referred to in FIGS. 6*a*, 6*b*, and 7, the PSU unit 400 may be stacked and disposed in the internal space 200S of the rear heat dissipation housing 200 at the same height as the main board 310 under the main board 310.

The PSU unit 400 may include a PSU board 410, and multiple electronic elements 419 including multiple PSU elements 417 that are disposed on any one of a front surface or back surface of the PSU board 410.

The PSU unit 400 may be provided to distribute and supply power to the main board 310 through the medium of multiple bus bars 340. More specifically, as referred to in FIGS. 6*a*, 6*b*, and 9, each of the multiple bus bars 340 may be disposed to interconnect a left end and right end of the PSU board 410 and the main board 310. In particular, the multiple bus bars 340 may be connected to the main board 310 through an operation of being inserted into connection holes 319 that have been previously formed in the main board 310.

In particular, upon driving, the PSU element 417 and electronic element 419 of the PSU unit 400 discharge a large amount of heat. As referred to in FIG. 7, a thermal contact accommodation unit 217 may be depressed backward and formed in a portion that belongs to the internal space 200S of the rear heat dissipation housing 200 and that is occupied by the PSU board 410, in accordance with a shape of the PSU element 417 and the electronic element 419. Accordingly, heat that is generated from the PSU element 417 and electronic element 419 of the PSU unit 400 can be discharged backward by using the rear heat dissipation housing 200 as a heat transfer medium.

However, heat that is generated from the PSU unit 400 does not need to be essentially discharged backward through the rear heat dissipation housing 200. Although not illustrated, it may be said to be natural that the PSU unit 400 may be provided to discharges heat forward toward the front heat dissipation housing 100 through the medium of a vapor chamber or heat pipe structure that is separately provided as a heat transfer medium. The reason for this is that the antenna apparatus 1 according to an embodiment of the present disclosure has a structure that is advantageous for forward heat dissipation through the front heat dissipation housing 100, unlike in the case in which the conventional radome is provided.

Figure 10:
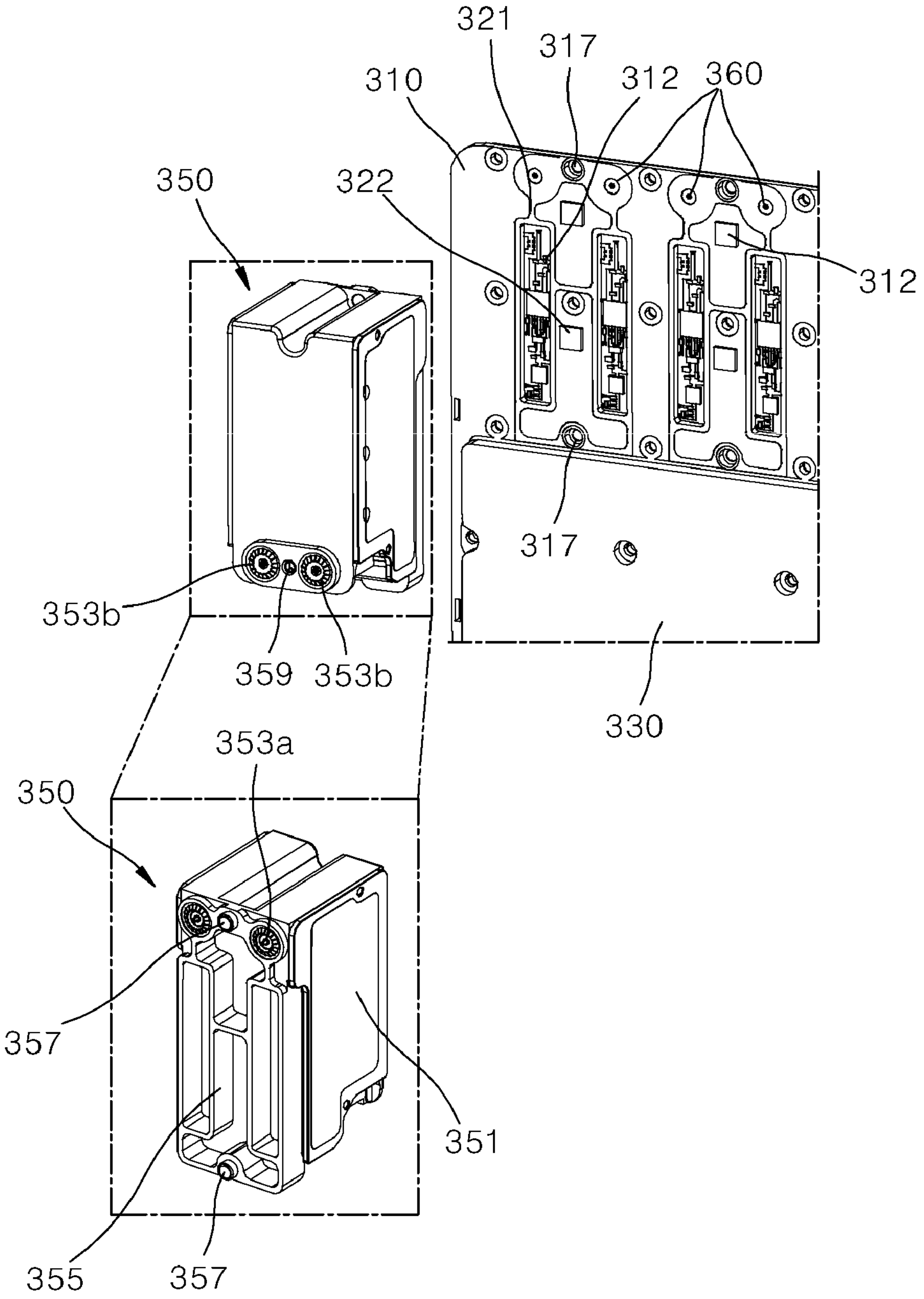
FIG. 10 is an exploded perspective view for describing a coupling form of the filter for the main board, among the components of FIG. 2.
Figure 11:
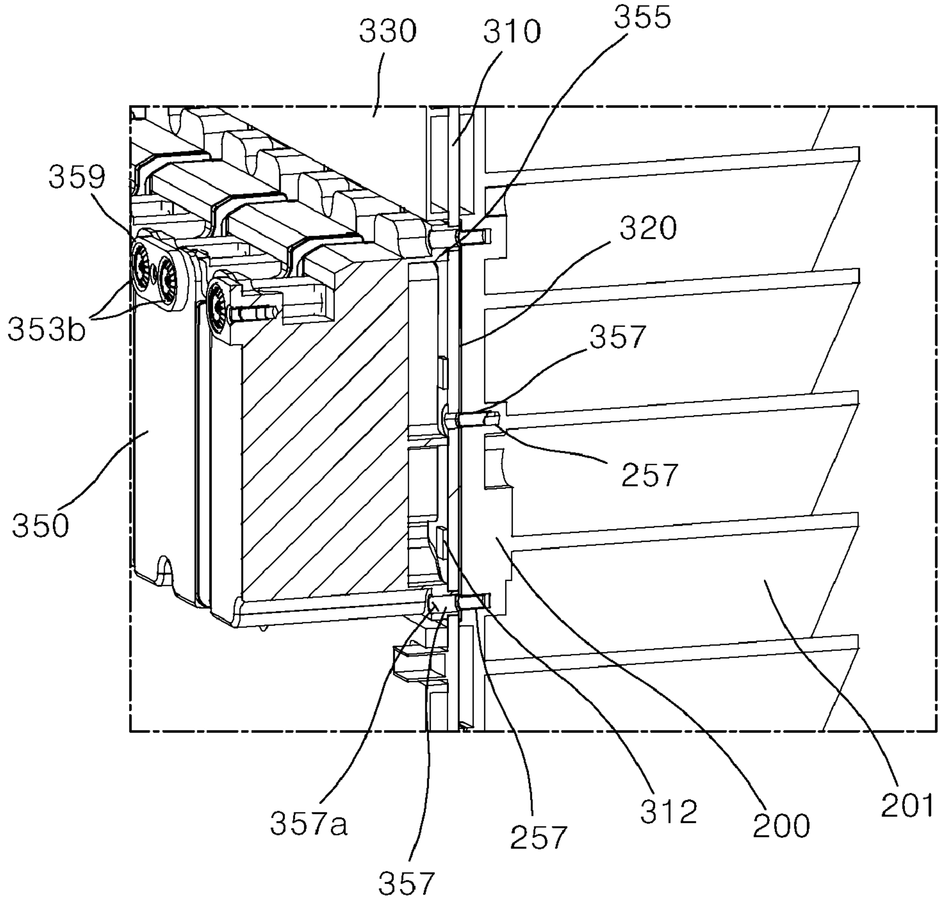
FIG. 11 is a partial cutaway perspective view for describing a heat dissipation form for heat that is generated from the filter through the medium of the rear heat dissipation housing, among the components of FIG. 2.

FIG. 10 is an exploded perspective view for describing a coupling form of the filter for the main board, among the components of FIG. 2. FIG. 11 is a partial cutaway perspective view for describing a heat dissipation form for heat that is generated from the filter through the medium of the rear heat dissipation housing, among the components of FIG. 2.

If the shielding pad 330 and the subboard 320 are stacked and disposed on the front and back surfaces of the main board 310, respectively, as described above, as referred to in FIGS. 10 and 11, the multiple filters 350 are mounted and disposed on the front surface of the main board 310 as RF filters.

In this case, each of the multiple filters 350 is a cavity filter in which the clamshell is integrally provided at the rear end part thereof. At least one filter assembly protrusion 357 to be inserted and assembled in a filter assembly hole 317 that has been formed in the main board 310 is formed in the portion at which the clamshell has been formed. The filter assembly protrusion 357 may be formed in a tube shape the inside of which is empty.

Accordingly, heat that is generated and collected from the LNA element 312 and the PA element 322 in the air layer between the rear end part of each of the multiple filters 350 and the main board 310 can be easily discharged toward the rear heat dissipation housing 200 through the filter assembly protrusion 357 having the tube shape and the heat discharge via hole 357*a* that has been formed in the main board 310.

Meanwhile, a pair of main board-side coaxial connectors 353*a* electrically connected to the power feed connector 360 that has been mounted on the main board 310 may be provided at the rear end part of each of the multiple filters 350. A pair of antenna-side coaxial connectors 353*b* electrically connected to the antenna module 110 that has been disposed on the front surface of the front heat dissipation housing 100 may be provided at the front end part of each of the multiple filters 350.

Furthermore, the thermal pad 109 that mediates thermal transfer to the back surface of the front heat dissipation housing 100 is disposed at the front end part of each of the multiple filters 350, so that heat that is generated from each of the multiple filters 350 can be more rapidly discharged forward by using the front heat dissipation housing 100 as a heat transfer medium.

Furthermore, a screw fastening hole 359 for screw coupling with the front heat dissipation housing 100 using a fixing screw 351 may be formed at the front end part of each of the multiple filters 350. The front heat dissipation housing 100 may be stacked and coupled with a front surface of each of the multiple filters 350 through an operation of the fixing screw 351 being fastened to the screw fastening hole 359 through a screw through hole 119 that has been formed in the front heat dissipation housing 100.

According to the construction, an effect could be seen in which heat of the filter 350 is lowered by about 14 to 16° C. compared to a conventional technology because heat that is generated from the filter 350 has direct contact with the back surface of front heat dissipation housing 100 or the director 117 for radiation, among the components of the antenna module 110. This is understood to be results from not only an influence attributable to the deletion of the radome that was an obstacle to heat dissipation conventionally, but an influence attributable to improved thermal transfer performance through direct thermal transfer (thermal conduction) to the back surface of the front heat dissipation housing 100 and the director 117 for radiation, which are made of a material suitable for discharging heat of the filter 350.

Figure 12A:
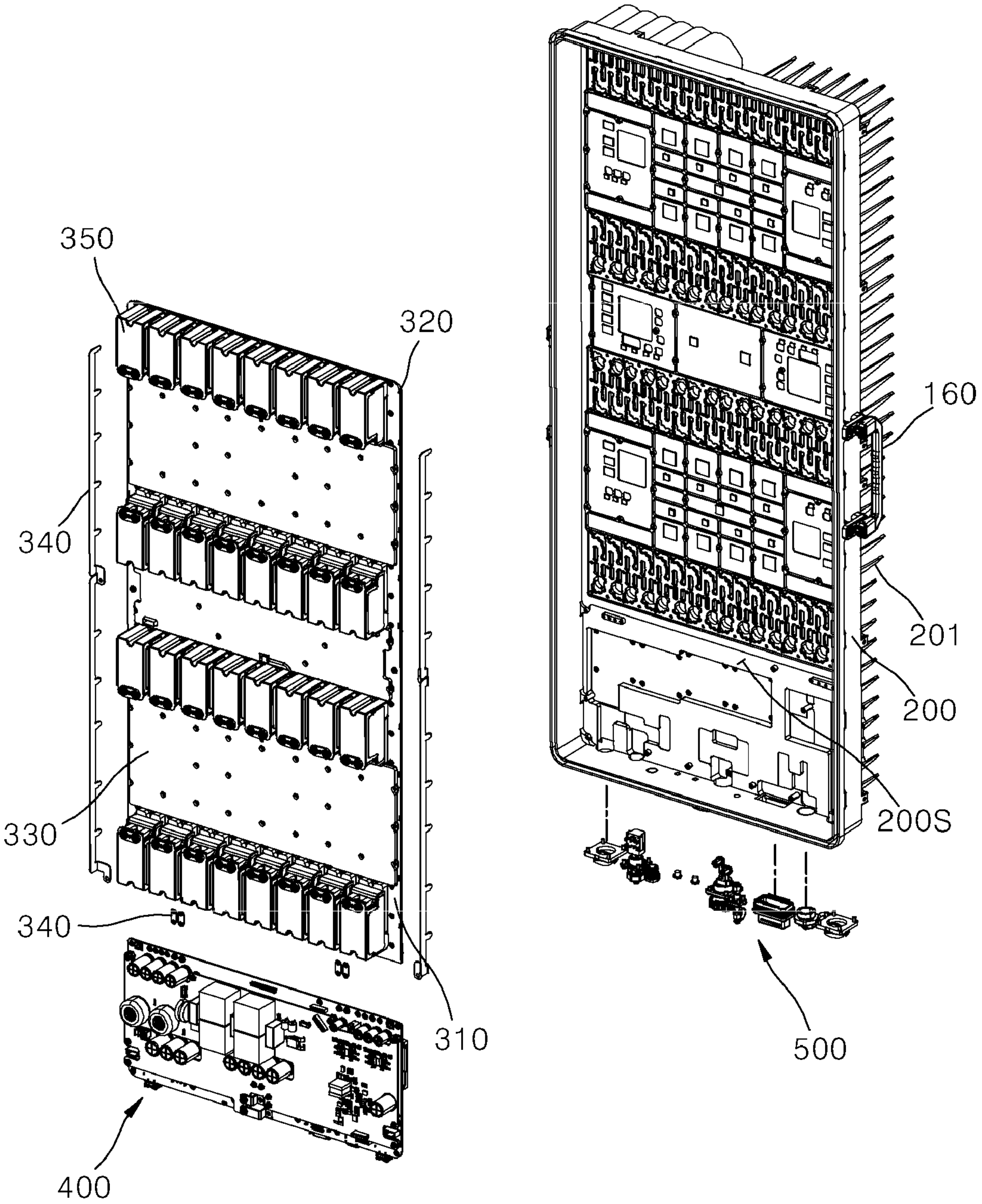
FIGS. 12*a* and 12*b* are front-side and rear-side exploded perspective views illustrating an assembly process of internal components for the rear heat dissipation housing, among the components of FIG. 2.
Figure 12B:
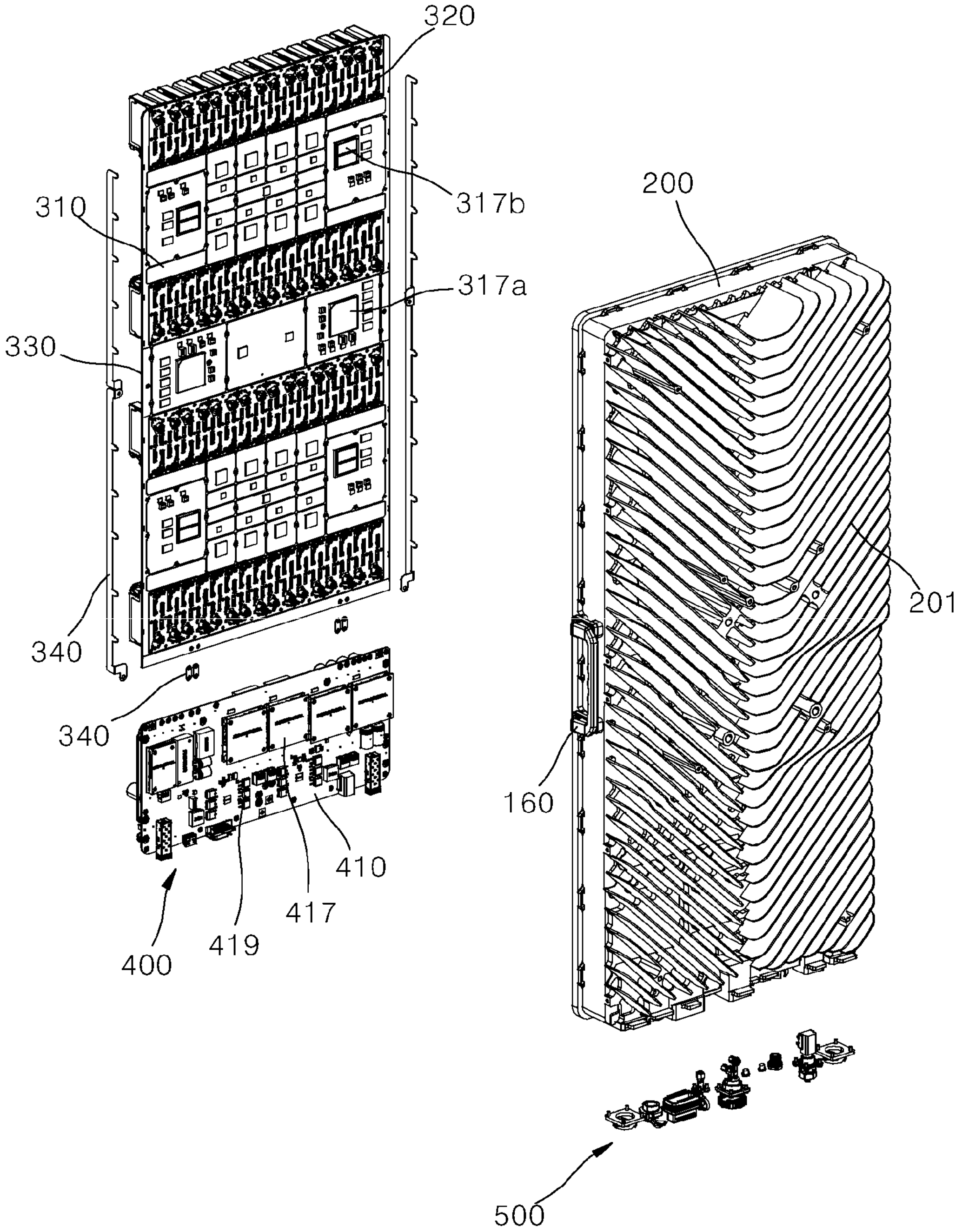
Figure 13:
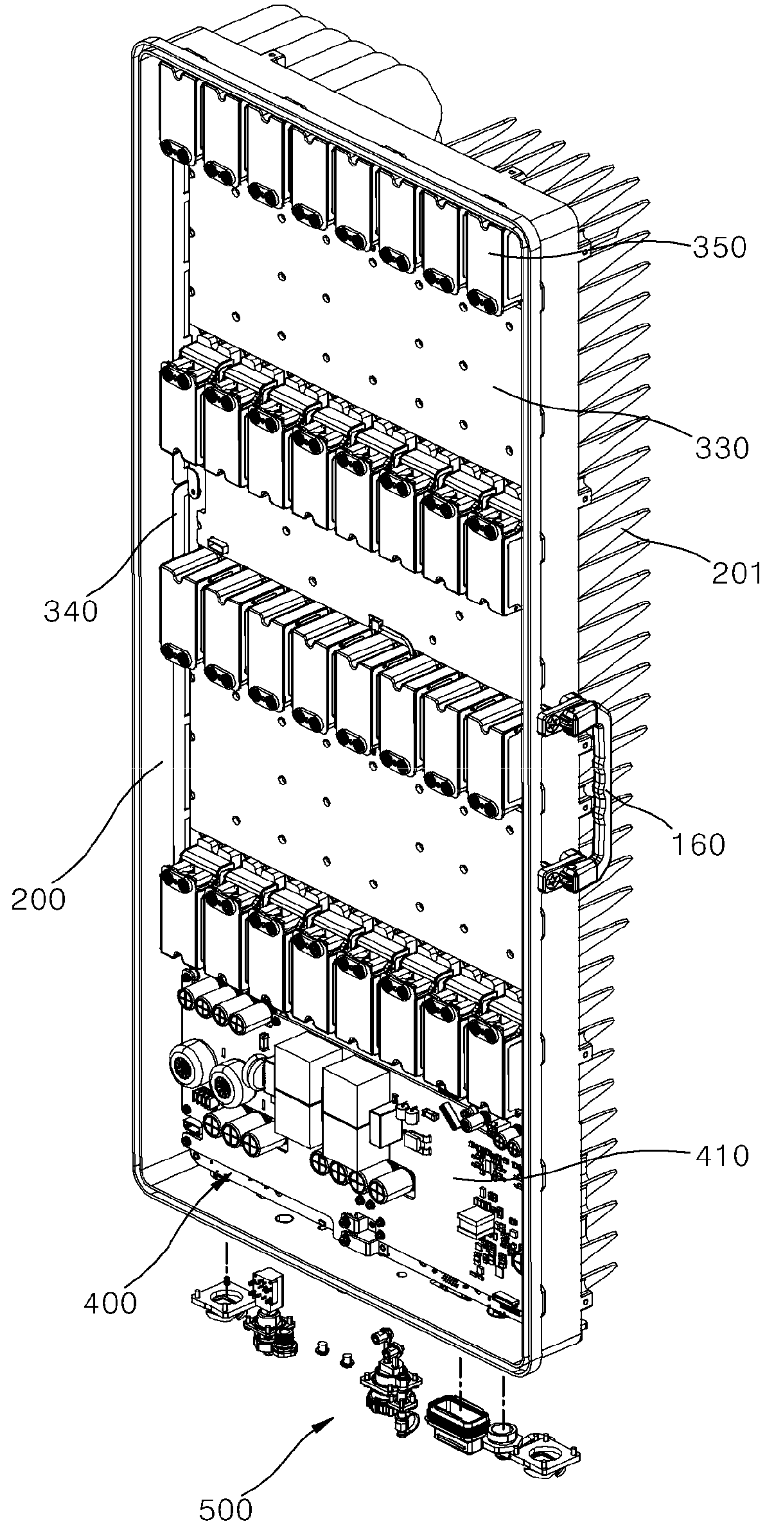
FIG. 13 is an exploded perspective view for describing an assembly process of outer members for the rear heat dissipation housing, among the components of FIG. 2.

FIGS. 12*a* and 12*b* are front-side and rear-side exploded perspective views illustrating an assembly process of internal components for the rear heat dissipation housing, among the components of FIG. 2. FIG. 13 is an exploded perspective view for describing an assembly process of outer members for the rear heat dissipation housing, among the components of FIG. 2.

As referred to in FIGS. 2 to 11, when the assembly of the components of the main board 310 and the assembly of the stack assembly 300 for the rear heat dissipation housing 200 are completed, the assembly of the outer member 500 is completed by moving the outer member 500 from the lower end part of the rear heat dissipation housing 200.

In this case, the internal space 200S of the rear heat dissipation housing 200 is fully shielded and sealed by the assembly of the front heat dissipation housing 100 and the antenna module 110, which is described later. Accordingly, a protection member, such as a separate radome, is not required.

Figure 14:
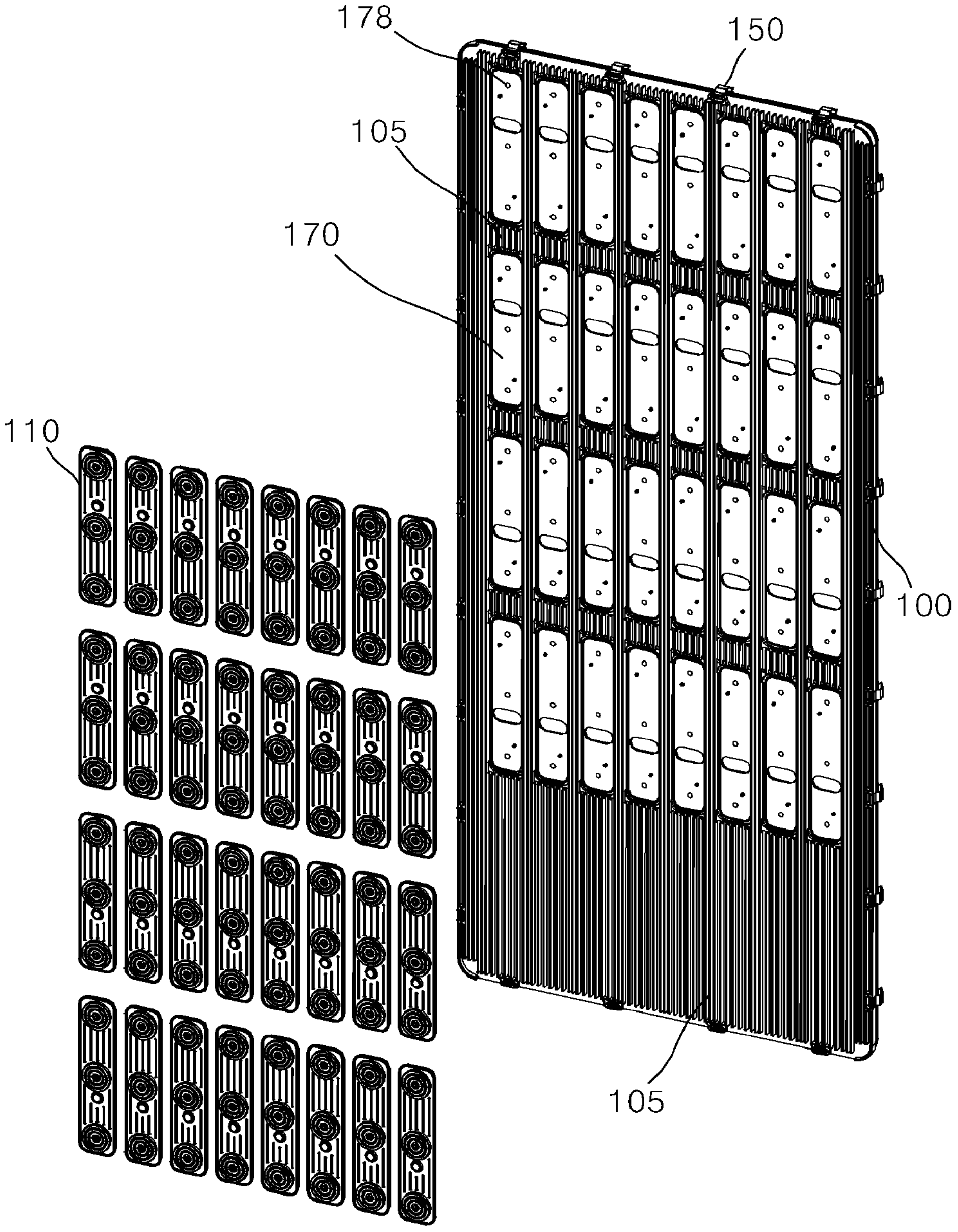
FIG. 14 is a front-side exploded perspective view for describing an installation form of an antenna module for a front heat dissipation housing, among the components of FIG. 2.
Figure 15:
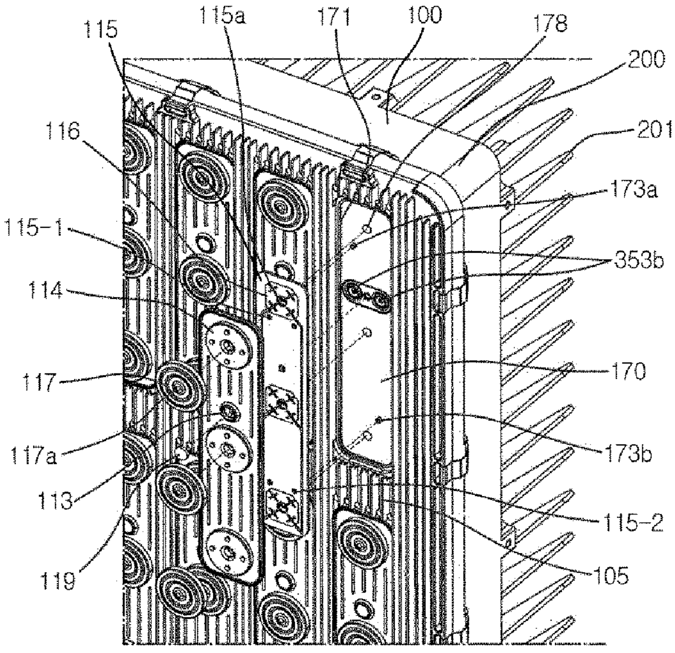
FIG. 15 are front-side and rear-side exploded perspective views illustrating an installation form of a front surface of the front heat dissipation housing of the antenna module, among the components of FIG. 14.
Figure 15:
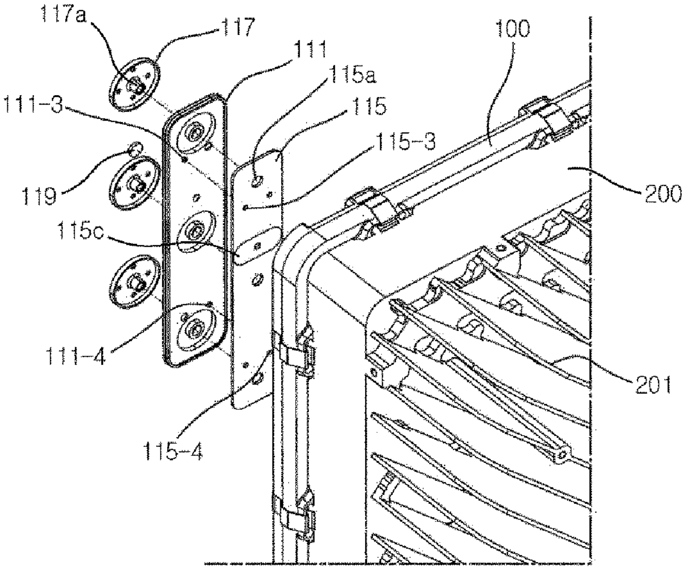
Figure 16:
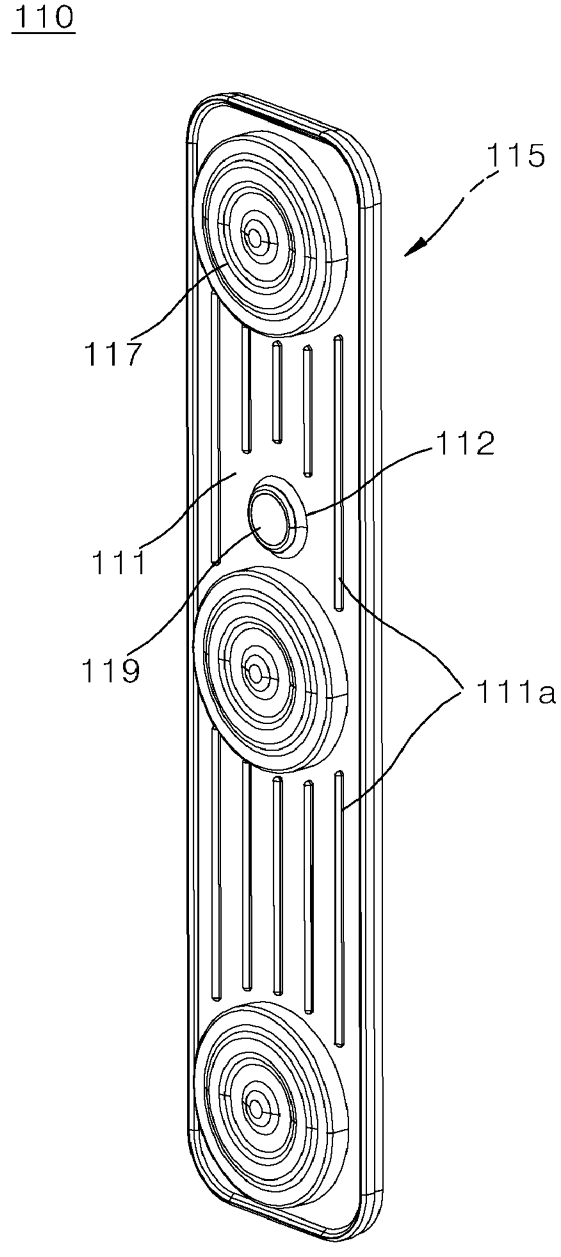
FIG. 16 is a perspective view illustrating the antenna module, among the components of FIG. 14.
Figure 17A:
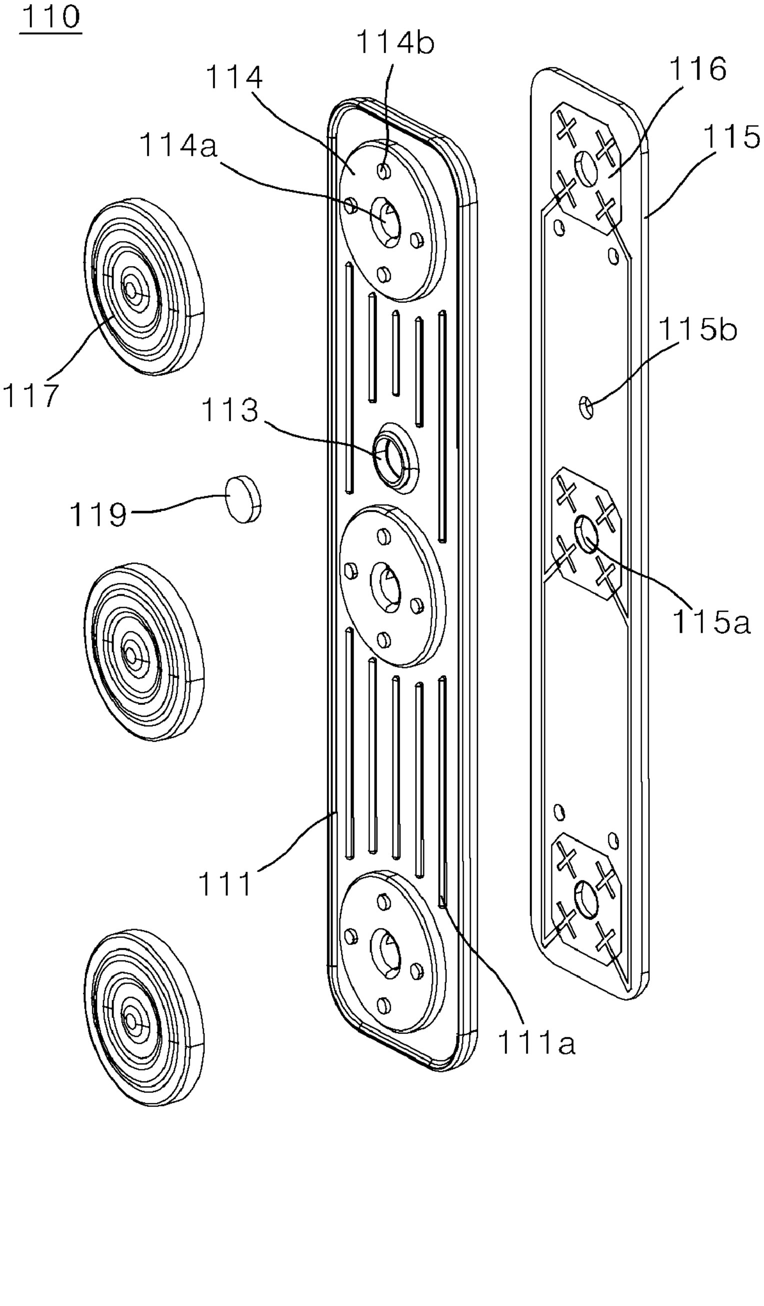
FIGS. 17*a* and 17*b* are a front-side exploded perspective view and back-side exploded perspective view of FIG. 14.
Figure 17B:
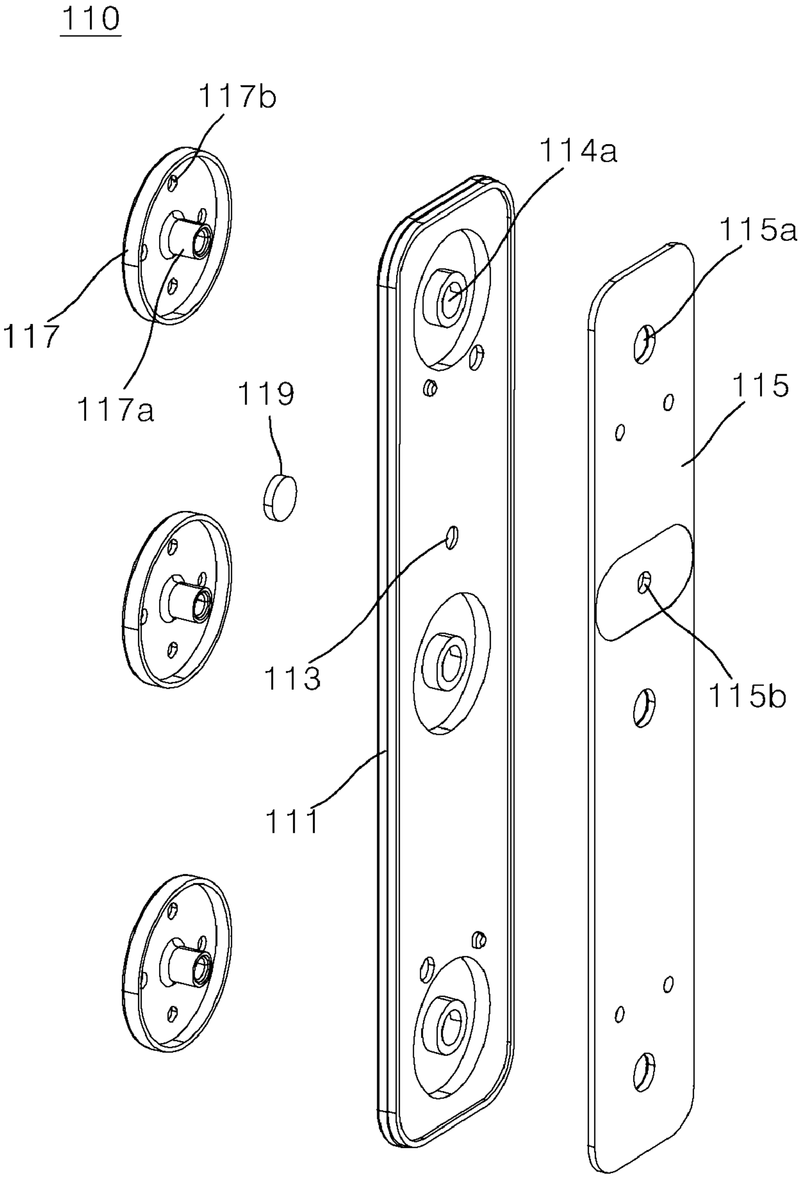
Figure 18:
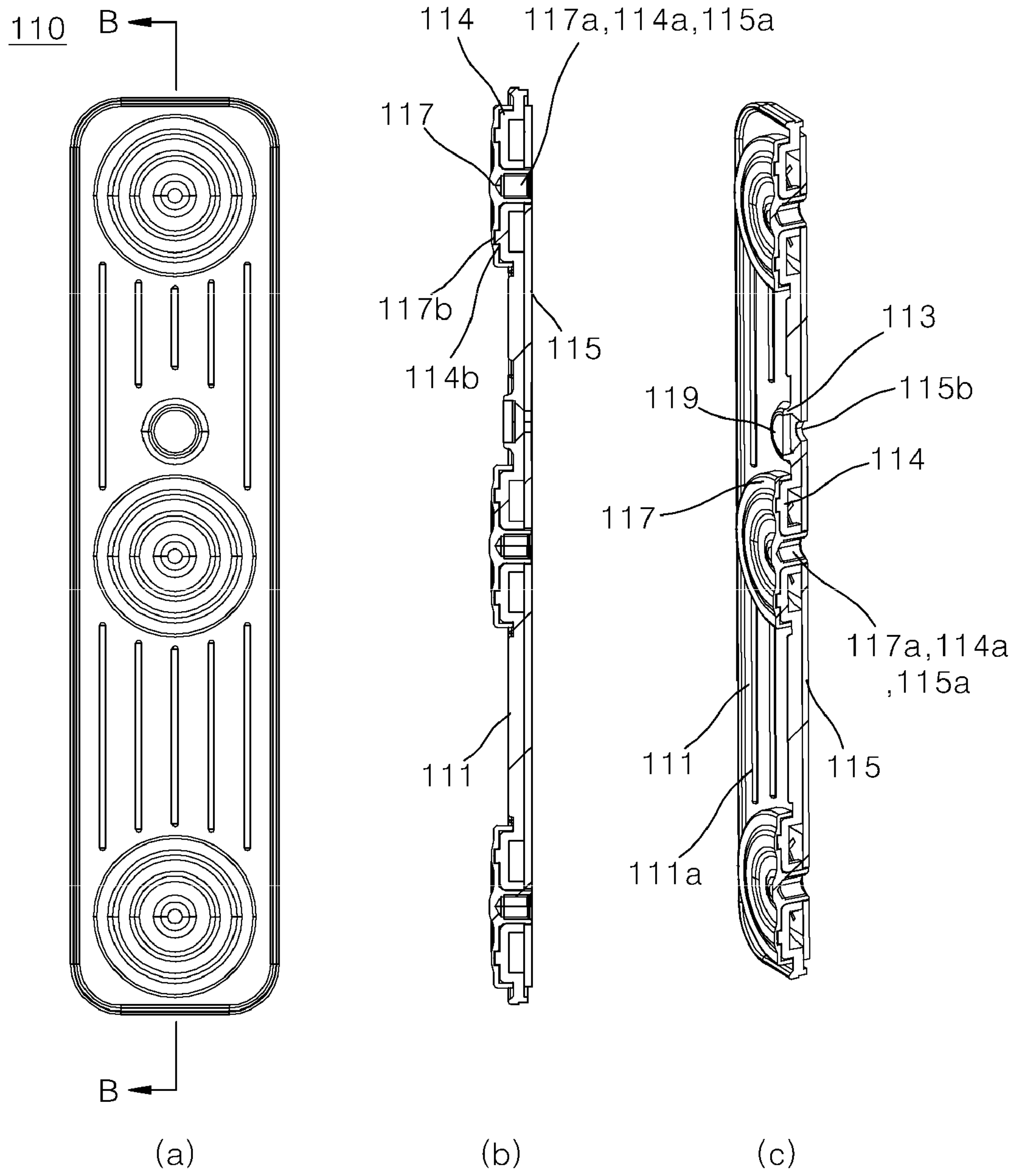
FIG. 18 is a front view of the antenna module, among the components of FIG. 14, and a cross-sectional view and cutaway perspective view taken along line B-B.

FIG. 14 is a front-side exploded perspective view for describing an installation form of the antenna module for the front heat dissipation housing, among the components of FIG. 2. FIG. 15 are front-side and rear-side exploded perspective views illustrating an installation form of the front surface of the front heat dissipation housing of the antenna module, among the components of FIG. 14. FIG. 16 is a perspective view illustrating the antenna module, among the components of FIG. 14. FIGS. 17*a* and 17*b* are a front-side exploded perspective view and back-side exploded perspective view of FIG. 14. FIG. 18 is a front view of the antenna module, among the components of FIG. 14, and a cross-sectional view and cutaway perspective view taken along line B-B.

In order to implement beamforming, as referred to in FIGS. 14 to 18 the multiple radiation elements are required as an array antenna. The multiple radiation elements can increase a concentration of radio waves in a designated direction by generating a narrow directional beam. Recently, a dipole type dipole antenna or a patch type patch antenna is most frequently used as the multiple radiation elements. The multiple radiation elements are designed and disposed to be spaced apart from each other so that mutual signal interference is minimized. In a conventional technology, in general, in order to prevent the arrangement design of such multiple radiation elements from being changed by an external environment factor, the radome that protects the multiple radiation elements against the outside was used as an essential component. Accordingly, in relation to an area portion that is covered by the radome, the discharge of system heat occurring due to an operation of the antenna apparatus 1 to the outside was very limited because the antenna board in which the multiple radiation elements and the multiple radiation elements are installed is not exposed to the air.

The radiation element 116 and 117 of the antenna apparatus 1 according to an embodiment of the present disclosure includes an antenna patch circuit unit 116 that is printed and formed on a printed circuit board 115 for a radiation element that is disposed in the antenna placement unit 170 and the director 117 for radiation that is made of a conductive metal material and that is electrically connected to the antenna patch circuit unit 116. The antenna patch circuit unit 116 is printed and formed on the printed circuit board 115 for a radiation element, and is provided as a dual polarized wave patch element that generates any one dual polarized wave of ±45 polarized waves that are orthogonal to each other or vertical/horizontal polarized waves. A power feed line (not illustrated) that supplies the antenna patch circuit unit 116 with a power feed signal is patternized and formed on the upper surface of the printed circuit board 115 for a radiation element so that the power feed line interconnects the antenna patch circuit units 116.

In a conventional antenna apparatus, the power feed line needs to be formed under the printed circuit board on which the antenna patch circuit unit is mounted. To this end, there are problems in that a power feed structure becomes complicated, such as that the power feed structure includes multiple through holes, and the power feed structure acts as a factor that hinders a direct surface thermal contact between the filter 350 and the printed circuit board 115 for a radiation element because the power feed structure occupies the lower space of the printed circuit board 115 for a radiation element. However, the power feed line according to an embodiment of the present disclosure has advantages in that the power feed structure becomes very simple and a coupling space in which the power feed line has direct surface thermal contact with the filter 350 and the printed circuit board 115 for a radiation element can be secured because the power feed line is patterned, printed, and formed on the same front surface as the printed circuit board 115 for a radiation element on which the antenna patch circuit unit 116 is patternized and printed.

The director 117 for radiation is made of a thermal conductive or conductive metal material and is electrically connected to the antenna patch circuit unit 116. The director 117 for radiation may perform a function for inducing the direction of a radiation beam in all directions and also transferring forward heat that is generated from the back of the printed circuit board 115 for a radiation element through thermal conduction. The director 117 for radiation may be metal made of a conductive material through which radio waves well flow. The directors 117 for radiation are installed on the antenna patch circuit units 116, respectively, in a way to be spaced apart from each other.

In this case, the height of the heat dissipation unit 105 (the heat dissipation pin) of the front heat dissipation housing 100 may be set by the height of the director 117 for radiation that is coupled with an antenna module cover 111 to be described later. It is natural that by changing and designing the height of the director 117 for radiation, the amount of heat dissipation can be adjusted by changing the height of a corresponding heat dissipation unit 105 (the heat dissipation pin).

In an embodiment of the present disclosure, the radiation element using the antenna patch circuit unit 116 and the director 117 for radiation has been described. If a dipole antenna is applied, however, the component of the director for radiation may be omitted. The amount of heat dissipation can be increased by setting the height of the heat dissipation unit 105 (the heat dissipation pin) to be higher in accordance with a relative height of the dipole antenna.

Referring to FIGS. 14 to 18, a protrusion part 117*a* that is formed in a back surface of the director 117 for radiation is electrically connected to the antenna patch circuit unit 116 through a through hole 114*a* of the antenna module cover 111. An overall size, shape, installation location, etc. of the director 117 for radiation may be properly designed experimentally or by simulating a corresponding characteristic, by measuring characteristics of a radiation beam that is radiated from a corresponding antenna patch circuit unit 116. The director 117 for radiation functions to induce the direction of a radiation beam that is generated from the antenna patch circuit unit 116 in all directions, and further reduces an overall beam width of the antenna and also makes better characteristic of a side lobe. Furthermore, the director 117 for radiation can compensate for a loss attributable to the patch type antenna, and can also perform a heat dissipation function because the director is metal of a conductive material. It is preferred that the director 117 for radiation has a proper shape for inducing the direction of a radiation beam in all directions, for example, a circular shape having undirectionality, but the present disclosure is not limited thereto.

Meanwhile, at least two antenna patch circuit units 116 and directors 117 for radiation may form one antenna module 110. FIGS. 14 to 18 illustrate an example in which three antenna patch circuit units 116 and directors 117 for radiation form one unit antenna module 110. The number of antenna patch circuit units 116 and the number of directors 117 for radiation may be changed depending on an optimal design of an antenna module for increasing a gain.

The antenna module 110 may further include the antenna module cover 111 for sealing at least one surface of the printed circuit board 115 for a radiation element, among the components of the antenna module 110.

A cover through hole 113 and a board through hole 115*b* that are penetrated in forward and backward directions thereof may be formed in the antenna module cover 111 and the printed circuit board 115 for a radiation element, respectively. Each of the antenna modules 110 may be fixed to the front surface of the antenna placement unit 170, through an operation of the fixing screw 351 sequentially penetrating the cover through hole 113 and the board through hole 115*b* from the outside of the front heat dissipation housing 100, then penetrating the screw through hole 119 of the front heat dissipation housing 100, and being fastened to the screw fastening hole 359 that has been formed at the front end part of the multiple filters 350.

In this case, as referred to in (a) of FIG. 15, an accommodation rib 178 in which at least the end of a corner of the antenna module cover 111 is accommodated is formed at a corner portion of the antenna placement unit 170. It is preferred that the antenna module cover 111 is forcedly fit into the accommodation rib 178 of the antenna placement unit 170 and has a size to the extent that airtightness or watertightness is possible.

As referred to in FIG. 15, location setting holes 115-1 to 115-4 that are penetrated in forward and backward directions thereof at four places on edge sides that form a quadrangle may be formed in the printed circuit board 115 for a radiation element. Two location setting protrusions 173*a* and 173*b* that are pressed in the two location setting holes 115-1 and 115-2 in a diagonal direction thereof, among the four location setting holes 115-1 to 115-4 formed in the printed circuit board 115 for a radiation element, may be formed in the front surface of the antenna placement unit 170. Two location setting protrusions 111-3 and 111-4 that are pressed in the remaining two location setting holes 115-3 and 115-4 not occupied by the two location setting protrusions 173*a* and 173*b* formed in the front surface of the antenna placement unit 170, among the four location setting holes 115-1 to 115-4 formed in the printed circuit board 115 for a radiation element, may be formed in a back surface of the antenna module cover 111.

Accordingly, as referred to in FIG. 15, when the antenna module 110 is installed in the antenna placement unit 170, after the two location setting protrusions 111-3 and 111-4 formed in the back surface side of the antenna module cover 111 are fixed to the two location setting holes 115-3 and 115-4 through an operation of the two location setting protrusions 111-3 and 111-4 being pressed and inserted into the two location setting holes 115-3 and 115-4 (refer to (b) of FIG. 15) by moving the printed circuit board 115 for a radiation element to the back surface side of the antenna module cover 111, the two location setting protrusions 173*a* and 173*b* may be temporarily fixed to the two location setting holes 115-1 and 115-2 of the printed circuit board 115 for a radiation element through an operation of the two location setting protrusions 173*a* and 173*b* being pressed and inserted into the two location setting holes 115-1 and 115-2 by moving the antenna module cover 111 with which the printed circuit board 115 for a radiation element has been coupled to the antenna placement unit 170 formed on the front surface of the front heat dissipation housing 100.

That is, the printed circuit board 115 for a radiation element may be stably disposed between the back surface of the antenna module cover 111 that is provided to cover a front surface of the printed circuit board 115 and the front surface of the antenna placement unit 170 of the front heat dissipation housing 100 that is provided to be closely attached to a back surface of the printed circuit board 115 because the location setting protrusions 111-3, 111-4, 173*a*, and 173*b* are pressed and inserted into the location setting holes 115-1 to 115-4, respectively.

As referred to in FIG. 15, the aforementioned antenna patch circuit unit 116 may be printed and formed on the front surface of the printed circuit board 115 for a radiation element. A conductive contact point pattern 115*c* may be printed and formed on the back surface of the printed circuit board 115 for a radiation element. Power can be fed toward the antenna patch circuit unit 116 by a contact point of the antenna-side coaxial connectors 353*b* that are provided at the front end of the filter 350 and the contact point pattern 115*c*.

In this case, the antenna module cover 111 may be injected and molded by using a plastic material. As referred to in FIG. 17*a*, a director fixing unit 114 a shape of which is matched with the back surface of the director 117 for radiation may be provided on one surface of the antenna module cover 111. A director fixing protrusion part 114*b* capable of being coupled with the director 117 for radiation may be formed in the director fixing unit 114 in a way to protrude forward.

Furthermore, as referred to in FIG. 17*b*, the director 117 for radiation may be pressed and fixed to at least one director fixing groove 117*b* that is depressed and formed at a location corresponding to at least one director fixing protrusion part 114*b* on the back surface of the director 117.

Furthermore, the filter fixing hole 113 for coupling with the filter 350 may be formed in the antenna module cover 111 through the antenna module cover 111. After a filter fixing screw (not illustrated) penetrates the antenna module cover 111 through the filter fixing hole 113, when the filter fixing screw is fastened to the screw fastening hole 359 formed in the filter 350 through the through hole 115*b* that has been formed in the printed circuit board 115 for a radiation element, the front heat dissipation housing 100 may be firmly stacked coupled with the front surface of the filter 350. As referred to in FIG. 16, it is preferred that the filter fixing hole 113 is sealed through the hole shielding cap 119.

In this case, at least one board fixing hole 114*a* for screw fastening by a fixing screw 180 with the printed circuit board 115 for a radiation element may be formed in the antenna module cover 111. Furthermore, the at least one fixing boss 117*a* that is exposed to the back surface of the antenna module cover 111 through the board fixing hole 114*a* may be formed on the back surface of the director 117 for radiation. The printed circuit board 115 for a radiation element may be fixed to the back surface of the antenna module cover 111, through an operation of the fixing screw 180 being fastened to the fixing boss 117*a* after passing through the director fixing hole 178 that has been formed to penetrate the antenna placement unit 170 of the front heat dissipation housing 100 in forward and backward directions.

It is preferred that the fixing screw 180 is provided as a pan head screw having a rear end part matched and fastened to the front surface of the filter 350 that is disposed behind the fixing screw 180. This is for making a rear end surface of the fixing screw 180, which has been provided as the pan head screw, have surface thermal contact with the front surface of the filter 350 in the greatest area possible. The fixing screw 180 and the director 117 for radiation are provided as a thermal conductive material. Heat that is discharged to the internal space 200S between the front heat dissipation housing 100 in which the filter 350 is provided and the main board 310 and between the front heat dissipation housing 100 and the PSU unit 400 may be discharged forward through a thermal conduction method of the front heat dissipation housing 100 itself or a thermal conduction method through the fixing screw 180 and the director 117 for radiation.

Furthermore, at least one reinforcement rib 111*a* may be formed in one surface of the antenna module cover 111, so that the reinforcement rib can form an outward appearance of the antenna module cover 111 and reinforce the strength of the antenna module cover 111 made of a plastic material.

A heat dissipation form of the antenna apparatus 1 constructed as above according to an embodiment of the present disclosure is described in brief as follows.

Heat that is generated between the main board 310 and the front heat dissipation housing 100 and heat that is generated from the filter 350 corresponding to the space between the main board 310 and the front heat dissipation housing 100 may be discharged forward from the front heat dissipation housing 100 through direct surface thermal contact with the back surface of front heat dissipation housing 100 or through the medium of the filter 350 and the director 117 for radiation.

In this case, the antenna apparatus 1 according to an embodiment of the present disclosure can achieve more excellent heat dissipation performance by changing, into a heat dissipation area, an area that is occupied by the conventional radome, instead of deleting the conventional radome.

Heat that is generated on the back surface side of the main board 310 and heat that is generated on the bask surface side of the PSU unit 400, on the basis of the main board 310, may have direct surface thermal contact with the rear heat dissipation housing 200, and can be rapidly discharged backward by using the multiple heat dissipation pins 201 that have been formed integrally with the rear heat dissipation housing 200.

At this time, heat that is collected by the clamshell as the space between the filter 350 and the main board 310 can be discharged backward through the filter assembly protrusion 357 of the filter 350 and the heat discharge via hole 357*a* of the main board 310 by using the rear heat dissipation housing 200 as a heat transfer medium.

As described above, the antenna apparatus 1 according to an embodiment of the present disclosure has effects in that system heat within the antenna apparatus 1 can be discharged in all directions including a forward direction as well as a backward direction by an area of the front heat dissipation housing 100 that is increased by the deletion of the radome and heat dissipation performance is greatly improved because the antenna module 110 is disposed in the front heat dissipation housing 100 of the antenna apparatus 1 in a way to be exposed to the air so that heat can be discharged forward and backward from the antenna apparatus 1.

The antenna apparatus according to an embodiment of the present disclosure has been described in detail with reference to the accompanying drawings. However, an embodiment of the present disclosure is not essentially limited to the aforementioned embodiment, and may include various modifications and implementations within an equivalent range thereof by a person having ordinary knowledge in the art to which the present disclosure pertains. Accordingly, the true range of a right of the present disclosure will be said to be defined by the appended claims.

INDUSTRIAL APPLICABILITY

The present disclosure provides the antenna apparatus having heat dissipation performance greatly improved because both the front housing and rear housing of the antenna apparatus are used in forward and backward heat dissipation by deleting the radome and disposing the radiation elements in the front housing of the antenna apparatus.

The invention claimed is:

1. An antenna apparatus comprising:

one or more antenna placement units in which at least one radiation element is disposed on a front surface of the antenna placement unit;

a front heat dissipation housing comprising a heat dissipation unit integrally formed between adjacent antenna placement units, among the one or more antenna placement units, exposed to an air, and configured to forward transfer heat that is generated from a back of the heat dissipation unit; and a rear heat dissipation housing coupled with the front heat dissipation housing and having a main board on which a filter for filtering an RF signal and an RF element are mounted provided within the rear heat dissipation housing, wherein heat that is generated from the filter is transferred to a front surface of the front heat dissipation housing through a contact with a back surface of the front heat dissipation housing by using the filter itself as a heat transfer medium, wherein the radiation element comprises:

an antenna patch circuit unit printed and formed on a printed circuit board for a radiation element that is disposed in the antenna placement unit; and a director for radiation made of a conductive metal material and electrically connected to the antenna patch circuit unit.

2. The antenna apparatus according to claim 1, wherein the director for radiation induces a direction of a radiation beam in all directions and also transfers heat that is generated from a back of the printed circuit board for a radiation element forward through thermal conduction.

3. The antenna apparatus according to claim 2, further comprising a PSU unit stacked and disposed in an internal space of the rear heat dissipation housing at a height identical with a height of the main board and comprising a PSU board on which multiple electronic elements comprising a PSU element are mounted and disposed on any one of a front or back surface of the PSU board, wherein heat that is generated from a back of the printed circuit board for a radiation element is heat that is generated from the filter and the multiple electronic elements.

4. The antenna apparatus according to claim 1, wherein the director for radiation is made of a thermal conductive material capable of the thermal conduction.

5. The antenna apparatus according to claim 1, wherein a power feed line for supplying a power feed signal to the antenna patch circuit unit is formed on an upper surface of the printed circuit board for a radiation element.

6. The antenna apparatus according to claim 1, wherein:

at least two antenna patch circuit units and the director for radiation form one antenna module, and the antenna module further comprises an antenna module cover for sealing the antenna patch circuit unit other than the director for radiation, which has been exposed to the air, so that the antenna patch circuit unit is protected.

7. The antenna apparatus according to claim 6, wherein:

a through hole is formed in one surface of the antenna module cover, and the director for radiation is coupled with a front surface of the antenna module cover in a way to be exposed to the air and electrically connected to the patch circuit unit through the through hole.

8. The antenna apparatus according to claim 6, wherein:

the antenna module cover is injected and molded, a director fixing unit a shape of which is matched with a back surface of the director for radiation is provided on one surface of the antenna module cover, wherein at least one director fixing protrusion part capable of being coupled with the director for radiation is formed in the director fixing unit in a way to protrude forward, and the director for radiation is pressed and fixed to at least one director fixing groove that is depressed and formed at a location corresponding to the at least one director fixing protrusion part on the back surface of the director for radiation.

9. The antenna apparatus according to claim 6, wherein:

the antenna module cover is injected and molded, and a filter fixing hole for coupling with the filter is formed in the antenna module cover through the antenna module cover.

10. The antenna apparatus according to claim 6, wherein:

the antenna module cover is injected and molded, and at least one board fixing hole for screw fastening by a fixing screw with the printed circuit board for a radiation element is formed in the antenna module cover through the antenna module cover.

11. The antenna apparatus according to claim 10, wherein at least one fixing boss that is exposed to a back surface of the antenna module cover through the board fixing hole is formed on a back surface of the director for radiation, and the printed circuit board for a radiation element is fixed to the back surface of the antenna module cover through an operation of the fixing screw being fastened to the fixing boss.

12. The antenna apparatus according to claim 11, wherein the fixing screw is provided as a pan head screw a rear end surface of which is fastened to a front surface of the filter in a way to be matched with the front surface of the filter.

13. The antenna apparatus according to claim 6, wherein:

the antenna module cover is injected and molded, and at least one reinforcement rib is integrally formed on one surface of the antenna module cover.

14. The antenna apparatus according to claim 6, wherein:

at least four location setting holes are formed in the printed circuit board for a radiation element, at least two location setting protrusions formed on a back surface of the antenna module cover that has been provided to cover a front surface of the printed circuit board for a radiation element are pressed and inserted into two location setting holes, among the four location setting holes, and at least two location setting protrusions formed on the front surface of the front heat dissipation housing that has been provided so that a back surface of the printed circuit board for a radiation element is closely attached to the front heat dissipation housing are pressed and inserted into two location setting holes, among the four location setting holes.

15. The antenna apparatus according to claim 1, wherein a thermal pad is interposed between the filter and the back surface of the front heat dissipation housing.

16. The antenna apparatus according to claim 1, wherein:

a field programmable gate array (FPGA) is disposed on an upper surface of the main board, and heat that is generated from the FPGA is transferred to the heat dissipation unit in front of the front heat dissipation housing through the back surface of the front heat dissipation housing.

17. The antenna apparatus according to claim 16, wherein the heat that is generated from the FPGA is transferred through a medium of any one of a heat pipe or vapor chamber that connects the FPGA and the back surface of the front heat dissipation housing.

18. The antenna apparatus according to claim 11, wherein:

the front heat dissipation housing is made of a metal material, the one or more antenna placement units are disposed to be exposed to the air, some of heat that is generated forward from the main board as a back of the front heat dissipation housing is discharged forward through a medium of the at least one radiation element, and a remainder of the heat is discharged forward through a medium of the front heat dissipation housing, and heat that is generated backward from the main board is discharged backward through a medium of the rear heat dissipation housing.

19. An antenna apparatus comprising:

multiple radiation elements configured to generate one polarized wave among dual polarized waves, wherein the dual polarized waves comprise ±45-degree polarized waves or vertical and horizontal polarized waves:

a front heat dissipation housing, comprising multiple antenna placement units disposed to be spaced apart from each other so that the multiple radiation elements are disposed on front surfaces of the multiple antenna placement units, respectively, and a heat dissipation unit integrally formed between mutually adjacent antenna placement units, among the multiple antenna placement units, exposed to an air, and configured to forward transfer heat that is generated from a back of the heat dissipation unit; and a rear heat dissipation housing coupled with the front heat dissipation housing and having a main board on which a filter for filtering an RF signal and an RF element are mounted accommodated therein, wherein:

a clamshell that performs a signal blocking function is formed integrally with a rear end part of the filter, and heat that is generated within the filter shielded by the clamshell is discharged backward through the rear heat dissipation housing.

20. The antenna apparatus according to claim 19, wherein:

the filter is fixed to the main board through a medium of a pipe for fixing which is formed at an end of the clamshell in a way to protrude backward and has a shape an inside of which is empty, and a heat discharge via hole that communicates with the pipe for fixing is formed in the main board.

21. The antenna apparatus according to claim 20, wherein the heat discharge via hole is plated with a thermal conductive material.

* * * * *